(12) United States Patent
Cao et al.

(10) Patent No.: US 9,225,163 B2
(45) Date of Patent: Dec. 29, 2015

(54) COMBINED ESD ACTIVE CLAMP FOR CASCADED VOLTAGE PINS

(71) Applicant: Infineon Technologies AG, Neubiberg (DE)

(72) Inventors: Yiqun Cao, Munich (DE); Andreas Rupp, Unterhaching (DE); Ulrich Glaser, Putzbrunn (DE)

(73) Assignee: Infineon Technologies AG, Neubiberg (DE)

( * ) Notice: Subject to any disclaimer, the term of this patent is extended or adjusted under 35 U.S.C. 154(b) by 27 days.

(21) Appl. No.: 14/070,209

(22) Filed: Nov. 1, 2013

(65) Prior Publication Data
US 2015/0124359 A1    May 7, 2015

(51) Int. Cl.
*H02H 9/04* (2006.01)

(52) U.S. Cl.
CPC ................ *H02H 9/04* (2013.01); *H02H 9/041* (2013.01); *H02H 9/043* (2013.01)

(58) Field of Classification Search
CPC ........... H02H 3/20; H02H 9/04; H02H 9/041; H02H 9/043
See application file for complete search history.

(56) References Cited

U.S. PATENT DOCUMENTS

| | | | | |
|---|---|---|---|---|
| 5,615,074 A | * | 3/1997 | Avery | 361/56 |
| 5,671,111 A | * | 9/1997 | Chen | 361/56 |
| 5,946,177 A | * | 8/1999 | Miller et al. | 361/56 |
| 6,064,249 A | * | 5/2000 | Duvvury et al. | 327/314 |
| 6,385,021 B1 | * | 5/2002 | Takeda et al. | 361/56 |
| 6,614,633 B1 | * | 9/2003 | Kohno | 361/56 |
| 8,144,441 B2 | * | 3/2012 | Ping et al. | 361/56 |
| 2011/0304940 A1 | | 12/2011 | Cao et al. | |
| 2012/0236444 A1 | | 9/2012 | Srivastava et al. | |

OTHER PUBLICATIONS

Y. Cao et al., "Statically Triggered Active ESD Clamps for High-Voltage Applications," Electrical Overstress/Electrostatic Discharge Symposium (EOS/ESD), Sep. 9-14, 2012, 10 pp., retrieved from http://xplqa30.ieee.org/xpl/login.jsp?tp=&arnumber=6333329 &url=http%3A%2F%2Fxplqa30.ieee.org%2Fxpls%2Ficp.jsp%3Farnumber%3D6333329.

M. Mergens et al., "ESD Protection Considerations in Advanced High Voltage Technologies for Automotive," Electrical Overstress/Electrostatic Discharge Symposium (EOS/ESD) Sep. 2006, 10 pp.

* cited by examiner

*Primary Examiner* — Zeev V Kitov
(74) *Attorney, Agent, or Firm* — Shumaker & Sieffert, P.A.

(57) ABSTRACT

A combined electro static discharge clamp for cascaded voltage pins can include an electronic switch, a plurality of discharge paths, and a plurality of trigger circuits. In response to detecting a voltage event across any two voltage pins, the trigger circuitry can turn on the electronic switch causing current caused by the voltage event to flow through one or more of the discharge paths instead of through functional circuitry which could potentially be damaged by the current caused by the voltage event.

22 Claims, 13 Drawing Sheets

COMBINED ESD ACTIVE CLAMP FOR CASCADED VOLTAGE PINS

TECHNICAL FIELD

This disclosure relates to electronics and, more particularly, relates to electrostatic discharge protection circuitry.

BACKGROUND

An imbalance of electric charges within or on the surface of a material creates static electricity. This charge imbalance is most commonly observed as resulting from what is known as the triboelectric effect, also referred to as triboelectric charging. Triboelectric charging causes materials with weakly bound electrons to lose electrons through friction to materials with sparsely filled outer shells, resulting in one material becoming positively charged and the other negatively charged. Electrostatic discharge (ESD) is the sudden flow of electricity between two objects caused by contact. In everyday life, a common example of triboelectric charging occurs when someone walks across a floor creating a buildup of static electricity, and a common example of ESD occurs when that person touches a light switch or other conductive material, sometimes resulting in a small spark.

The spark created in the example above is typically harmless, and sometimes even imperceptible, to human beings but can potentially be very damaging to electronic devices and components. The example above of a person walking across a floor and touching a conductive material is just one of many examples of how static electricity can buildup and result in ESD. To prevent damage caused by ESD, electronics manufacturers often include ESD protection circuitry in electronic devices and components such as integrated circuits (ICs) and printed circuit boards (PCBs). An IC with a ground pin and cascaded voltage pins (i.e. pins with different supply voltages), for example, may include ESD protection circuitry to protect the functional circuits between the various pin combinations from both positive and negative ESD stresses. One type of ESD protection circuitry commonly used in electronic devices is an ESD clamp. Upon detecting an overvoltage or voltage spike across two pins, caused for example by an ESD event, the ESD clamp directs current caused by the overvoltage or voltage spike away from functional circuitry, for example to a ground.

ESD protection circuitry adds to overall circuit complexity and requires physical space on the circuit but may be necessary in some cases to protect the functional circuitry of the circuit. Without ESD protection circuitry, circuit reliability is potentially reduced, and the need for time consuming and costly circuit replacement is potentially increased.

SUMMARY

This disclosure introduces an electrostatic discharge (ESD) clamp that includes one big electronic switch, referred to in this disclosure as a big switch, and different trigger circuits to turn on the big switch for different stress combinations, i.e. different overvoltage conditions across different pin combinations. By using a big switch with different trigger circuits instead of multiple, separate ESD clamps, the techniques of this disclosure may allow for ESD protection circuitry that utilizes less area when implemented on an IC or PCB and that may also be simpler to implement when compared to prior art ESD clamps.

In one example, a circuit includes an electronic switch, trigger circuitry configured to detect voltage events across a plurality of nodes, and path circuitry configured to direct current through the electronic switch in response to the trigger circuitry detecting a voltage event across two nodes of the plurality of nodes.

In another example, a circuit includes a first pin configured to receive a first voltage; a second pin configured to receive a second voltage; a third pin configured to receive a third voltage; an electronic switch that is connected to the first pin and the third pin; trigger circuitry, wherein the trigger circuitry is configured to detect a first voltage event across the first pin and the third pin, and in response to detecting the first voltage event, direct current through the electronic switch and detect a second voltage event across the second pin and the third pin, and in response to detecting the second voltage event, direct current through the electronic switch and detect a third voltage event across the first pin and the second pin, and in response to detecting the third voltage event, direct current through the electronic switch.

The details of one or more examples are set forth in the accompanying drawings and the description below. Other features, objects, and advantages will be apparent from the description and drawings, and from the claims.

DESCRIPTION

This disclosure describes an electrostatic discharge (ESD) clamp that includes one big ESD switch, sometimes referred to in this disclosure as a big switch, and different trigger circuits to turn on the big switch for different stress combinations. Electronic devices currently use multiple ESD clamps with different voltage classes to protect the pins of a circuit against ESD events. This disclosure describes techniques for combining multiple ESD clamps into one ESD clamp including a big switch and different trigger circuits. By using a big switch with different trigger circuits instead of multiple, separate ESD clamps, the techniques of this disclosure may allow for ESD protection circuitry that utilizes less area when implemented on an integrated circuit (IC) or a printed circuit board (PCB) and that may also be simpler to implement when compared to prior art ESD clamps. The circuit design techniques introduced in this disclosure may be implemented into a wide array of highly integrated devices or ICs including microprocessors, microcontrollers, application-specific integrated circuits (ASICs), digital signal processors (DSPs), automotive ICs, security ICs, and power management ICs, and may also be implemented into non-highly integrated devices including PCBs. Circuits implementing the design techniques introduced in this disclosure may be included in consumer electronics, industrial electronics, automotive electronics, or virtually any other type of electronics.

The ESD switch used to implement the techniques of this disclosure is an electronic switch that may, for example, be a metal-oxide-semiconductor field-effect transistor (MOSFET) device, a bipolar transistor, a Gallium Nitride (GaN) FET, a thyristor, or some other type of electronic switch. This disclosure will present several examples of ESD protection circuits that use a MOSFET switch, also referred to in this disclosure as a BigMOS, but it should be understood that other types of switches, including those listed above, may similarly be used to implement the techniques of this disclosure. As used in this disclosure, the "big" in big switch or BigMOS generally refers to the overall area needed to implement the ESD protection. For example, certain components such as a forward diode or a trigger circuit, which may be used to implement the techniques of this disclosure and which will be described in more detail below, have about 10% the size of a BigMOS. A BigMOS may, for example, be between 5000 $um^2$ and 100000 $um^2$ depending on specified ESD requirements.

Figure 1A:
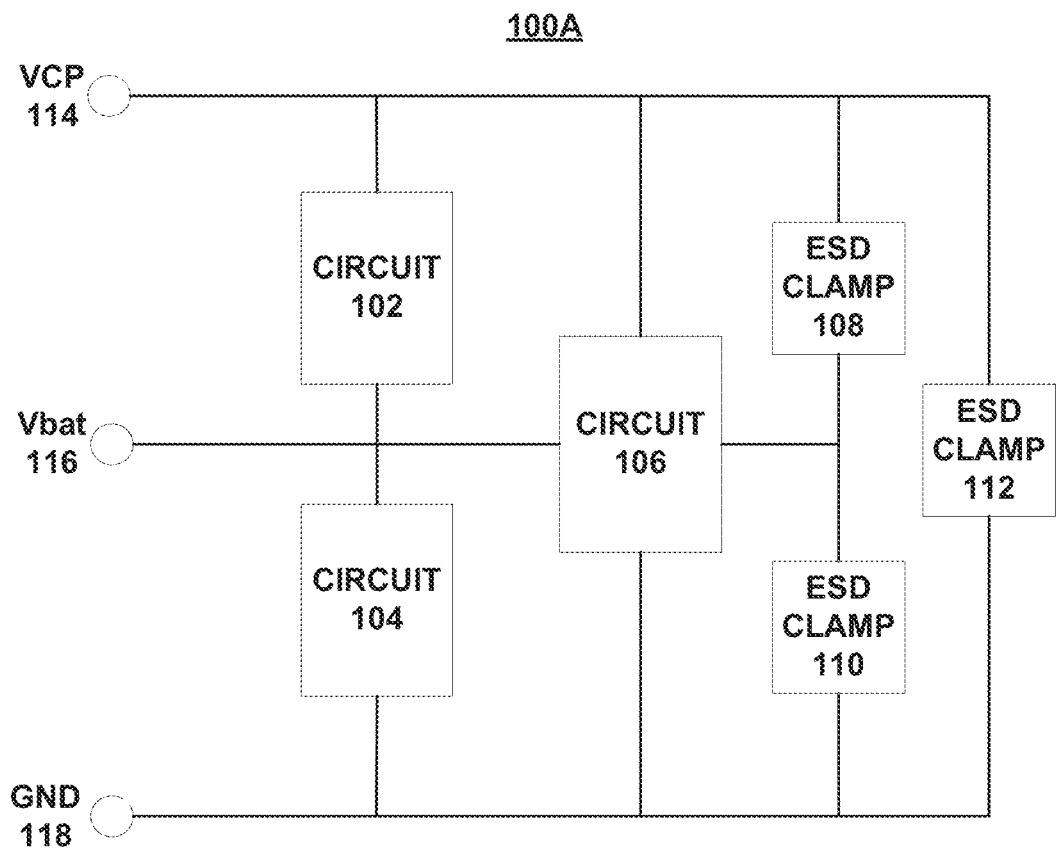
FIG. 1A shows a schematic view of a prior art ESD concept using different ESD clamps to protect different circuits

FIG. 1A shows a schematic view of device 100A, which utilizes an example of ESD protection circuitry. Device 100A may, for example, be an IC, PCB, or some other type of circuit. Device 100A includes circuit 102, circuit 104, circuit 106, ESD clamp 108, ESD clamp 110, and ESD clamp 112. Circuit 102, circuit 104, and circuit 106 represent functional circuits, meaning they are configured to perform the desired functionality of device 100A. ESD clamp 108, ESD clamp 110, and ESD clamp 112 represent ESD protection circuitry, meaning they are configured to protect circuit 102, circuit 104, and circuit 106 from ESD events. Device 100A has voltage pin 114, voltage pin 116, and voltage pin 1118, which are configured to receive different classes of voltages. Voltage pins 114, 116, and 118 are configured to receive VCP, Vbat, and GND, respectively. VCP may, for example, be a higher voltage than Vbat, which in turn may be a higher voltage than GND.

Circuit 102 is connected between voltage pin 114 and voltage pin 116, and in instances when an ESD event causes a voltage difference greater than VCP−Vbat plus a margin across voltage pins 114 and 116, ESD clamp 108 is configured to direct current away from circuit 102, thus protecting circuit 102 from the overvoltage across voltage pins 114 and 116. Similarly, circuit 104 is connected between voltage pin 116 and voltage pin 118, and in instances when an ESD event causes a voltage difference greater than Vbat−Gnd plus a margin across voltage pins 116 and 118, ESD clamp 110 is configured to direct current away from circuit 104, thus protecting circuit 104 from the overvoltage across voltage pins 116 and 118. Circuit 106 is connected between voltage pin 114 and voltage pin 118, and in instances when an ESD event causes a voltage difference greater than VCP−Gnd plus a margin across voltage pins 114 and 118, ESD clamp 112 is configured to direct current away from circuit 106, thus protecting circuit 106 from the overvoltage across voltage pins 114 and 118. The above examples include a margin factor because the threshold voltages at which ESD clamp 108, ESD clamp 110, and ESD clamp 112 are configured to detect an overvoltage condition may not be the same as the normal operating voltage. Instead, ESD clamp 108, ESD clamp 110, and ESD clamp 112 may, for example, be configured to detect an overvoltage condition at a voltage that is slightly higher than the normal operating voltage.

ESD clamp 108, ESD clamp 110, and ESD clamp 112 may additionally, or alternatively, be configured to detect voltage spikes across voltage pins 114 and 116, voltage pins 116 and 118, and voltage pins 114 and 118, respectively. As can be seen in the example of FIG. 1A, three separate ESD clamps are used to protect three separate functional circuits from ESD events that may occur between different voltage pins.

Figure 1B:
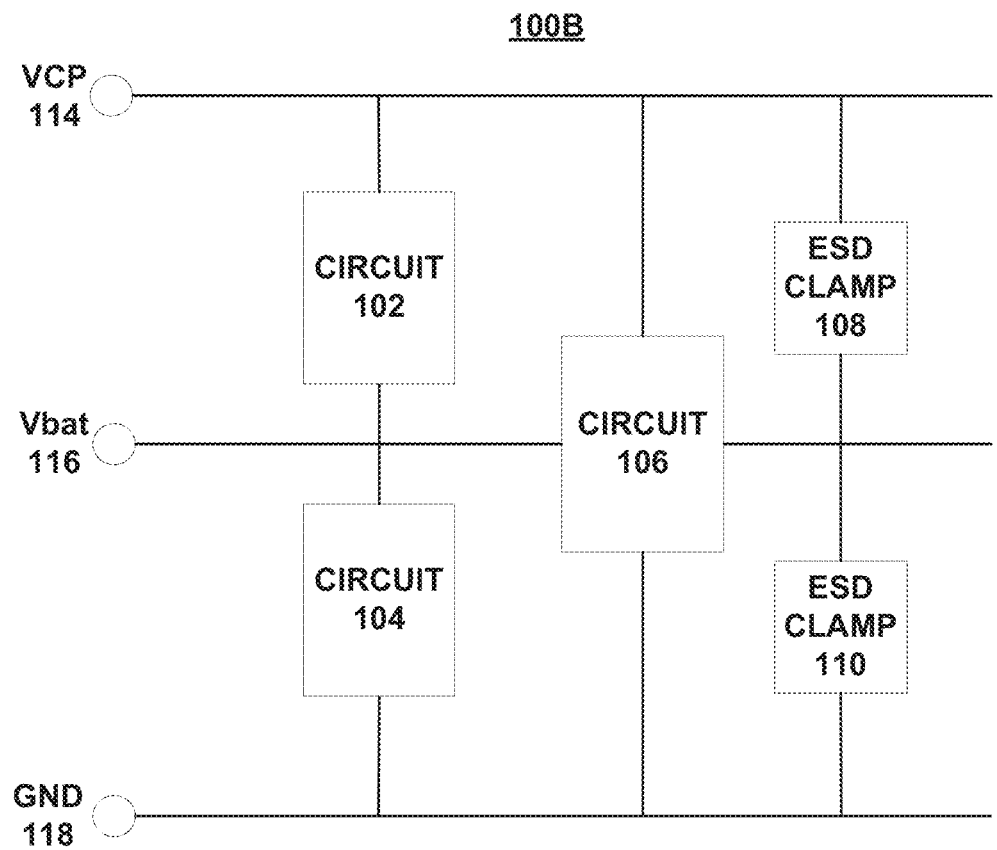
FIG. 1B shows a schematic view of a prior art ESD concept using stacked ESD clamps to protect different circuits

FIG. 1B shows a schematic view of device 100B, which utilizes another example of ESD protection circuitry. Device 100B uses stacked ESD clamps to protect different functional circuits. The components shown in FIG. 1B generally behave in the same manner as like-numbered components described above with respect to FIG. 1A, but device 100B only includes two ESD clamps instead of three. In Device 100B, ESD clamp 108 and ESD clamp 110 are cascaded to protect circuit 106 from an overvoltage condition across voltage pins 114 and 118. Thus in the configuration of device 100B, circuit 106 is connected between voltage pin 114 and voltage pin 118, and in instances when an ESD event causes a voltage difference greater than VCP−Gnd across voltage pins 114 and 118, the combination of ESD clamp 108 and ESD clamp 110 is configured to direct current away from circuit 106, thus protecting circuit 106 from the overvoltage across voltage pins 114 and 118. While the configuration shown in FIG. 1B reduces the number of ESD clamps from three to two relative to the configuration shown in FIG. 1A, ESD clamp 108 and ESD claim 110 may need to be larger when configured for device 100B than when configured for device 100A, thus negating some of the benefit of the cascaded configuration of device 100B. The design techniques shown for both device 100A and device 100B potentially suffer from large area consumption and high ESD design costs due to the requirement of multiple ESD clamps.

In contrast to the designs shown in FIGS. 1A and 1B, the ESD clamps of this disclosure may include a big switch and different trigger circuits to turn on the big switch for different stress combinations, i.e. different overvoltage or voltage spike combinations across different pin combinations. One or more forward-biased diodes can be used to create discharge paths that direct the ESD current away from functional circuitry, thus protecting the functional circuitry. The big switch conducts the main ESD current, and the trigger circuits detect overvoltages or transient voltages occurring between different pins at different voltage classes. When implementing the techniques of this disclosure, the trigger circuits typically occupy a much smaller layout area compared to the big switch, and thus, by only using one big switch in combination with multiple trigger circuits, the amount of layout area dedicated to ESD protection can be reduced when compared to the techniques described relative to FIGS. 1A and 1B. As an example, in one implementation of the techniques of this disclosure, a BigMOS was found to occupy approximately 16,000 micrometers of layout area, while the trigger circuits occupied approximately 2200 micrometers each of layout area. The ESD clamps of this disclosure may also result in lower leakage currents and parasitic capacitances due to the use of a BigMOS switch and the reduced number of independent ESD clamps.

Figure 2A:
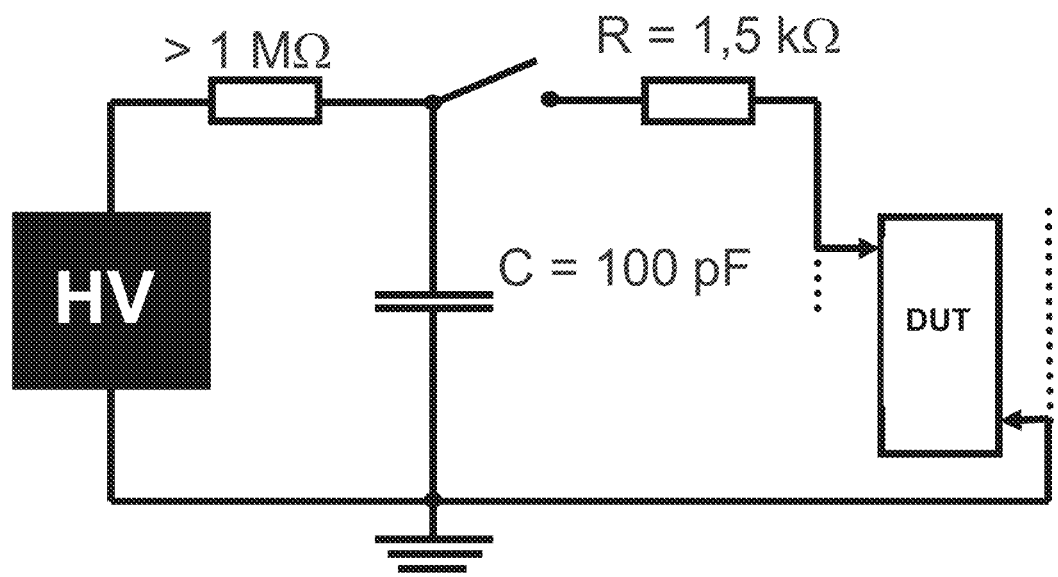
FIG. 2A shows a circuit representing a human body model (HBM) that can simulate a charged operator.
Figure 2B:
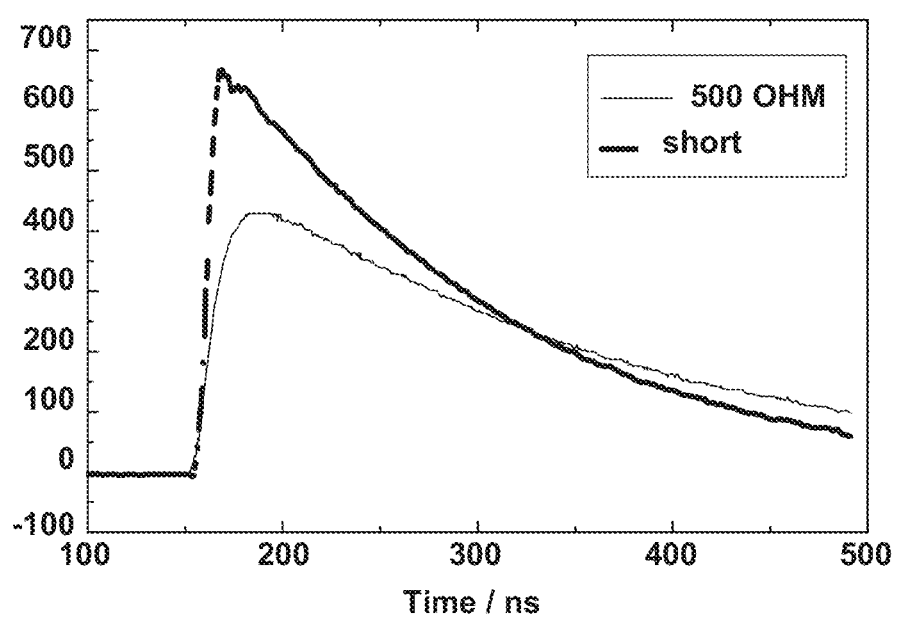
FIG. 2B shows an example of a discharge profile produced by the HBM circuit in FIG. 2A.

FIG. 2A shows a circuit representing a human body model that can simulate a charged operator. At a charging voltage of 1000V, when discharged, the circuit of FIG. 2A can produce a peak current of approximately 600-740 mA, with a rise time of approximately 2 ns to 10 ns and a decay time of approximately 130 ns to 170 ns. The discharge profile shown in FIG. 2B represents an example of a type of discharge which the techniques of this disclosure may help to protect against.

Figure 3:
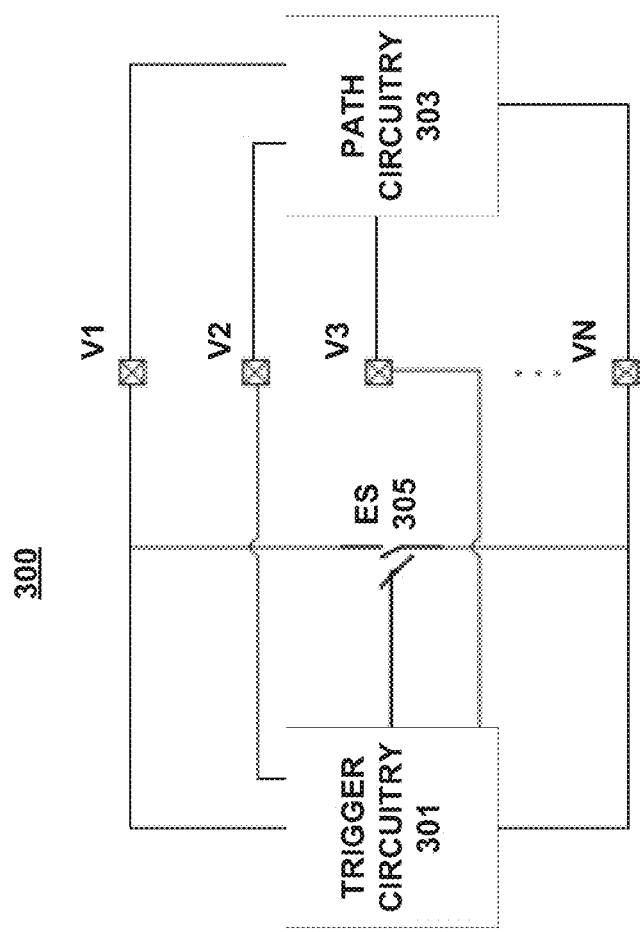
FIG. 3 shows an example of a circuit that includes ESD protection in accordance with the techniques of this disclosure.

FIG. 3 shows an example of a circuit that includes ESD protection in accordance with the techniques of this disclosure. Circuit 300 includes trigger circuitry 301, path circuitry 303, and electronic switch 305. Circuit 300 includes N nodes, labeled in FIG. 3 as V1, V2, V3 . . . VN. The nodes of FIG. 3 may, for example, correspond to cascaded voltage input pins. In the example, of FIG. 3, it can be assumed that under normal operating conditions, the voltage at V1 represents a highest voltage and the voltage at VN represents a lowest voltage. Thus, in the example of FIG. 3, electronic switch 305 is connected between the highest voltage (V1) and the lowest voltage (VN). Upon detecting a voltage event, such as an overvoltage or voltage spike, across any two of the N nodes, trigger circuitry 301 can turn on electronic switch 305, causing the current created by the voltage event to flow through electronic switch 305 to a ground or reference voltage and away from functional circuitry that could potentially be damaged by the voltage event. For example, upon detecting a voltage event across nodes V2 and VN, trigger circuitry 301 can turn on electronic switch 305, and path circuitry 303 can create a discharge path from node V2, through node V1, and through electronic switch 305 to VN.

Figures 4A, 4B:
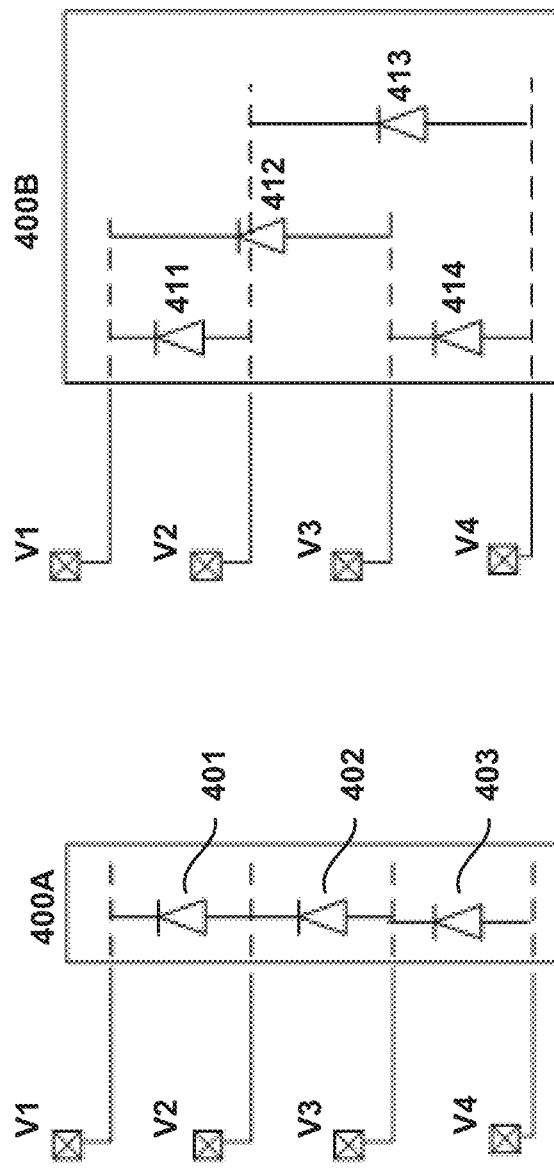
FIG. 4A-4C show example portions of path circuitry that may be used to implement techniques of this disclosure.
Figure 4C:
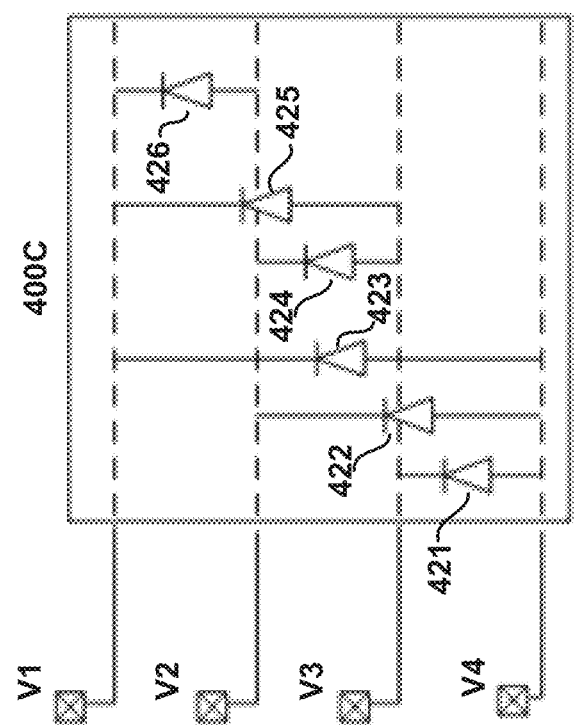

FIGS. 4A-4C show example portions of path circuitry, such as path circuitry 303 of FIG. 3. The examples of FIGS. 4A-4C show path circuitry for four cascaded nodes, although the techniques of this disclosure may be extended to configurations with more or fewer nodes. In the example of FIG. 4A, path circuitry 400A includes diodes 401, 402, and 403 in series. As will be explained in greater detail below, diodes 401-403 may comprise forward-biased diodes that can be used to create discharge paths that direct an ESD current away from functional circuitry, thus protecting the functional circuitry. In the example of FIG. 4B, path circuitry 400B includes diodes 411, 412, 413, and 414 in parallel. As will be explained in greater detail below, diodes 411-414 may comprise forward-biased diodes that can be used to create discharge paths that direct an ESD current away from functional circuitry, thus protecting the functional circuitry. In the example of FIG. 4C, path circuitry 400C includes diodes 421, 422, 423, 424, 425, and 426, which likewise may comprise forward-biased diodes that can be used to create discharge paths that direct an ESD current away from functional circuitry, thus protecting the functional circuitry.

Referring to FIG. 4A and connecting in this example the electronic switch to V1 and V4 (not shown in FIG. 4A), if an overvoltage event is detected between V2 and V3, then current flows through diode 401 in the forward direction, through node V1, through an electronic switch (not shown in FIG. 4A) to V4, and through diode 403 to V3. As another example, if an overvoltage event is detected between V3 and V4, then current flows through diode 402 and diode 401 in the forward direction, through node V1, through the electronic switch and to V4. If an overvoltage event occurs between V4 and V3, where V4 is higher than V3, then current flows through diode 403 in the forward direction.

FIG. 4B shows another implementation of path circuitry. Path circuitry 400B generally operates in a manner similar to that of 400A, but in path circuitry 400B, some node combinations have single diode paths, while some node combinations have paths that include multiple diodes, meaning the paths for some node combinations may fully or partially overlap with the paths for other node combinations. For example, with respect to FIG. 4B, if an overvoltage is detected between V3 and V4, then current only flows through one diode (i.e. diode 412) instead of two diodes (i.e. diodes 401 and 402) as shown in FIG. 4A. If, however, an overvoltage occurs at V4, then current may flow through diode 414 and diode 412 and/or current may flow through diode 413 and diode 411. FIG. 4C shows yet another implementation of path circuitry, where each node combination has a dedicated path. The techniques of this disclosure, introduced with respect to FIGS. 3 and 4A-C will be described in greater detail below.

Figure 5:
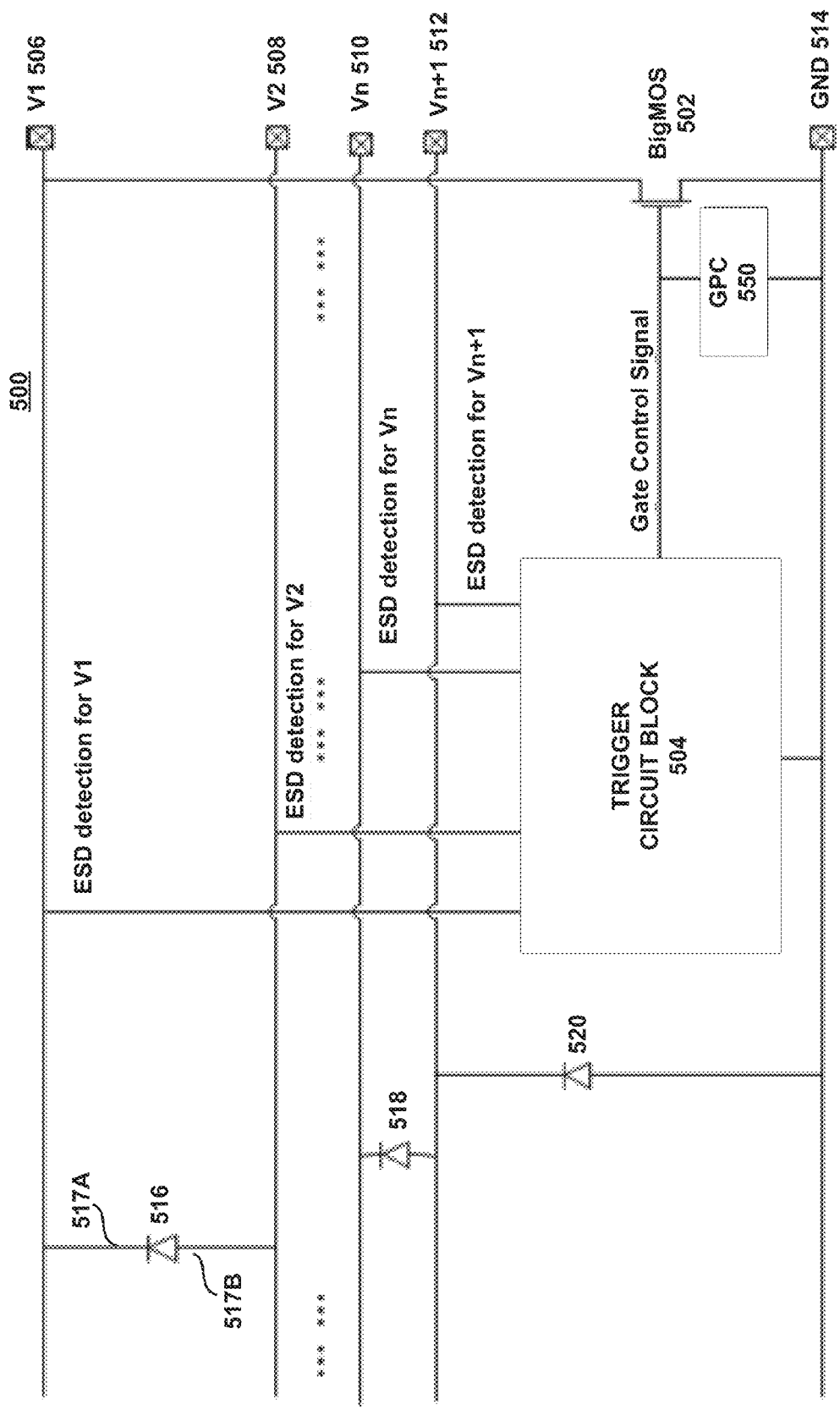
FIG. 5 shows an example of a circuit that includes ESD protection in accordance with the techniques of this disclosure.

FIG. 5 shows circuit 500, which includes ESD protection in accordance with the techniques of this disclosure. Circuit 500 includes BigMOS 502, trigger circuit block 504, and voltage pins 506, 508, 510, 512, and 514. Circuit 500 also includes diode 516, diode 518, and diode 520. The ellipses shown between $V_2$ and $V_N$ are intended to represent voltage pins, and corresponding ESD protection circuitry that is not explicitly shown in FIG. 5, meaning that the techniques of FIG. 5 are not limited to circuits with a specific number of voltage pins but instead may be used with a variable number of voltage pins. Circuit 500 also optionally includes gate protection circuitry (GPC) 550 configured to protect the gate oxide of the BigMOS from overvoltage in case of an ESD event. GPC 550, however, is not required for implementing the techniques of this disclosure and, furthermore, gate protection circuitry may be unnecessary for certain types of ESD switches, such as bipolar transistors or thyristors.

In the example of FIG. 5, voltage pin 506 is configured to receive voltage $V_1$; voltage pin 508 is configured to receive voltage $V_2$; voltage pin 510 is configured to receive voltage $V_N$; voltage pin 512 is configured to receive voltage $V_{N+1}$; and voltage pin 514 is configured to receive voltage GND. A drain of BigMOS 502 is connected to the highest voltage input pin of circuit 500, which is voltage pin 506 in the example of FIG. 5, and a source of BigMOS 502 is connected to the lowest voltage input pin of circuit 500, which is voltage pin 514 in the example of FIG. 5. As used in this disclosure, the term connected should not be interpreted to only mean directly connected, as in some instances two components may be connected via intermediate components. Voltages $V_2$, $V_N$, and $V_{N+1}$ may be any voltages between $V_1$ and GND; however, for purposes of example, it may be assumed for FIG. 5, that the following condition holds: $V_1 > V_2 > V_N > V_{N+1} > GND$. $V_1$, $V_2$, $V_N$, $V_{N+1}$, and GND represent the voltages that voltage pins 506, 508, 510, 512, and 514 are configured to receive under normal operating conditions.

Each of voltage pins 506, 508, 510, 512, and 514 connects to trigger circuit block 504. Trigger circuit block 504 may be configured to detect an overvoltage and/or a voltage spike between any combination of two pins of voltage pins 506, 508, 510, 512, and 514. An overvoltage generally occurs when the voltage between two pins is greater than the normal operating voltage between those two pins. Therefore, the voltage value at which trigger circuit block 504 may be configured to determine that an overvoltage is present may be a voltage that is sufficiently higher than the normal operating voltage for the two pins, such that trigger circuit block 504 does not detect an overvoltage when circuit 500 is operating under normal conditions, but sufficiently below a potentially damage-causing voltage level, such that trigger circuit block 504 detects an overvoltage before functional circuitry is damaged. In circuit 500, for example, the normal operating voltage between voltage pin 506 and voltage pin 508 is $V_1$-$V_2$. Therefore, trigger circuit block 504 may be configured to detect an overvoltage at a voltage that is typically 101% to 200% of $V_1$-$V_2$ or an absolute value of between 0.5V and 1.5V above $V_1$-$V_2$. The specific voltage at which trigger circuit block 504 detects an overvoltage may be adjusted based on design considerations that may vary for different circuits being used in different applications.

A voltage spike generally refers to a rate of increase in voltage per time (dV/dT) that is greater than a threshold rate of increase. Therefore, the value of dV/dT at which trigger circuit block 504 may be configured to determine that a voltage spike is present may be a value of dV/dT that is sufficiently higher than value of dV/dT that may occur under normal operating conditions, such that trigger circuit block 504 does not detect a voltage spike when circuit 500 is operating under normal conditions, but sufficiently below a potentially damage-causing value for dV/dT, such that trigger circuit block 504 detects voltage spike before functional circuitry is damaged. The threshold value for dV/dT may, for some implementations, be in the range of 0.1 V/ns to 100 V/ns. The threshold value for determining what constitutes a voltage spike may, however, vary widely depending on the particular application for which the ESD protection circuit is being implemented. This disclosure will use the term voltage event to generally refer to either an overvoltage or a voltage spike.

Diode 516, diode 518, and diode 520 may all comprise forward-biased diodes. In the schematic of FIG. 5, diode 516 has terminal 517A and 517B. When the voltage at terminal 517A is greater than the voltage at terminal 517B, then little or no current flows through diode 516. When the current at terminal 517B is sufficiently greater than the voltage at terminal 517A, then current flows through diode 516 from terminal 517B to terminal 517A. As mentioned above, under normal operating conditions, $V_1$>$V_2$, meaning little or no current flows through diode 516; however, when a voltage event occurs at voltage pin 508, the voltage at terminal 517B may be larger than the voltage at terminal 517A causing current to flow through diode 516. Diode 518 and diode 520 generally behave in the same manner as diode 516, and under normal operating conditions, little or no current flows through diode 518 and diode 520.

In response to detecting a voltage event, trigger circuit block 504 sends a gate control signal to BigMOS 502, and turns BigMOS 502 "on" so that current flows through BigMOS 502. The gate control signal turns on BigMOS 502 such that current flows from the drain of BigMOS 502 to the source of the BigMOS 502 which is connected to ground. Under normal operating conditions, however, trigger circuit block 504 does not send a gate control signal to BigMOS 502, and BigMOS 502 is "off" so that very little current flows through BigMOS 502. In this disclosure, saying a BigMOS is "on" is generally intended to mean that the BigMOS is conducting current, while saying the BigMOS is "off" is generally meant to mean the BigMOS is not conducting current.

As one example, under normal operating conditions, voltage pin 506 receives voltage $V_1$, and voltage pin 514 receives voltage GND, meaning the voltage across voltage pins 506 and 514 is $V_1$-GND. Circuit 500 may include portions of functional circuitry (not shown in FIG. 5) that operate at a voltage of $V_1$-GND. When the voltage across voltage pins 506 and 514 is $V_1$-GND, then trigger circuit block 504 does not detect an overvoltage and does not send a gate signal to turn on BigMOS 502. If, however, an ESD event occurs at voltage pins 506 and 514, then the voltage across voltage pins 506 and 514 may be higher than $V_1$-GND, in which case trigger circuit block 504 detects the overvoltage condition and sends a gate control signal to BigMOS 502, which turns on BigMOS 502. When BigMOS 502 is on, current caused by the overvoltage condition flows through BigMOS 502 to ground as opposed to flowing through functional circuitry, which could potentially damage the functional circuitry.

In a separate example, under normal operating conditions, voltage pin 508 receives voltage $V_2$, and voltage pin 514 receives voltage GND, meaning the voltage across voltage pins 508 and 514 is $V_2$-GND. Circuit 500 may include portions of functional circuitry (not shown in FIG. 5) that operate at a voltage of $V_2$-GND. When the voltage across voltage pins 508 and 514 is $V_2$-GND, then trigger circuit block 504 does not detect an overvoltage and does not send a gate signal to turn on BigMOS 502. If however, an ESD event occurs at voltage pins 508 and 514, then the voltage across voltage pins 508 and 514 may be higher than $V_2$-GND, in which case trigger circuit block 504 detects the overvoltage condition and sends a gate control signal to BigMOS 502, which turns on BigMOS 502. When BigMOS 502 is on, current caused by the overvoltage condition flows through diode 516 and BigMOS 502 to ground as opposed to flowing through functional circuitry, which could potentially damage the functional circuitry.

In the example of a voltage event at voltage pins 506 and 514, as described above, the current caused by the voltage event can flow directly from voltage pin 506 to ground through BigMOS 502 because, as mentioned above, voltage pin 506 is configured to receive the highest voltage and is connected directly to BigMOS 502. Voltage pin 508, however, is not connected directly to BigMOS 502. Instead, when a voltage event occurs between voltage pins 508 and 514, the current caused by the voltage event flows to ground through diode 516 and through BigMOS 502. When an overvoltage event occurs between voltage pins 510 and 514, the current caused by the overvoltage flows to ground through diode 518, further diode(s) between pins 510 and 508 (represented by the ellipses in FIG. 5), diode 516, and BigMOS 502.

Figure 6:
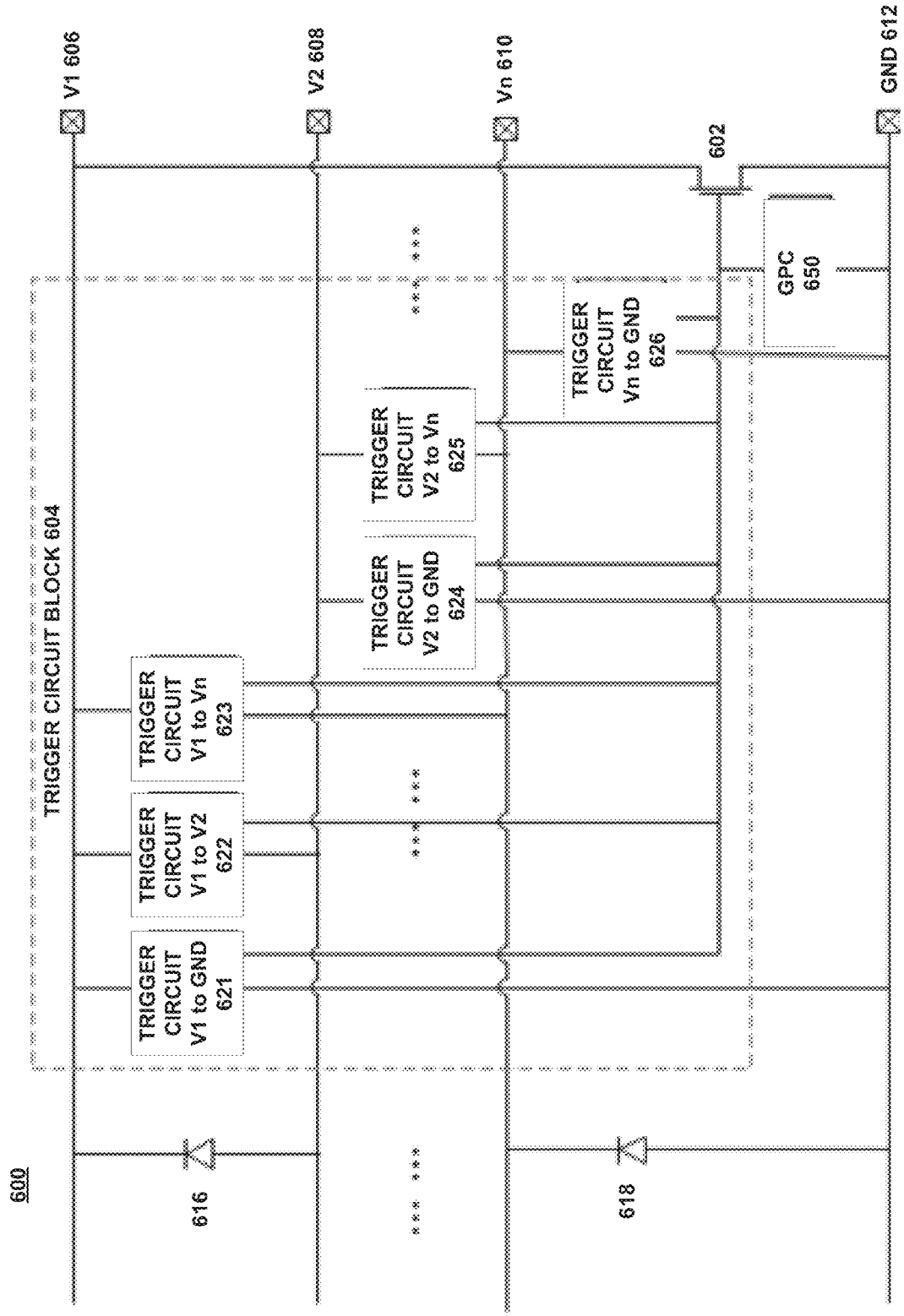
FIG. 6 shows an example of a circuit that includes ESD protection in accordance with the techniques of this disclosure.

FIG. 6 shows circuit 600, which includes ESD protection in accordance with the techniques of this disclosure. Circuit 600 includes BigMOS 602, trigger circuit block 604, and voltage pins 606, 608, 610, and 612. Circuit 600 also includes diode 616 and diode 618. Trigger circuit block 604 includes trigger circuit 621, trigger circuit 622, trigger circuit 623, trigger circuit 624, trigger circuit 625, and trigger circuit 626. As mentioned above, the techniques of this disclosure are not limited to circuits with a specific number of voltage pins but instead may be used with a variable number of voltage pins. Circuit 600 also optionally includes gate protection circuitry (GPC) 650 configured to protect the gate oxide of the BigMOS from overvoltage in case of an ESD event. GPC 650, however, is not required for implementing the techniques of this disclosure and, furthermore, gate protection circuitry may be unnecessary for certain types of ESD switches.

In the example of FIG. 6, voltage pin 606 is configured to receive voltage $V_1$; voltage pin 608 is configured to receive voltage $V_2$; voltage pin 610 is configured to receive voltage $V_N$; voltage pin 612 is configured to receive voltage GND. A drain of BigMOS 602 is connected to the highest voltage input pin of circuit 600, which is voltage pin 606 in the example of FIG. 6, and a source of BigMOS 602 is connected to the lowest voltage input pin of circuit 600, which is voltage pin 612 in the example of FIG. 6. Voltages $V_2$ and $V_N$ may be any voltages between $V_1$ and GND; however, for purposes of example, it may be assumed for FIG. 6, that the following condition holds: $V_1>V_2>V_N>$GND. $V_1$, $V_2$, $V_N$, and GND represent the voltages that voltage pins 606, 608, 610, and 612 are configured to receive under normal operating conditions. FIG. 6 is intended to be a generic diagram for a circuit with N+1 input pins. As shown in FIG. 6, if N equals 3, meaning circuit 600 has four input pins, then circuit 600 may include six trigger circuits to detect voltage events across the different permutations of two pins. If N is greater than 3, then circuit 600 may include additional trigger circuits to detect voltage events across the additional permutations of two input pins.

Each of voltage pins 606, 608, 610, and 612 connects to trigger circuit block 604. Trigger circuit block 604 may be configured to detect an overvoltage and/or a voltage spike between any combination of two pins of voltage pins 606, 608, 610, and 612. Diode 616 and diode 618 are forward-biased diodes. As stated above, circuit 600 is intended to be a generic representation of a circuit with N+1 inputs. Accordingly, the number of forward biased diodes included in circuit 600 may vary depending on the number of inputs, and hence vary based on the number of trigger circuits. Trigger circuit block 604 generally behaves in the same manner as trigger circuit block 504 described above with respect to FIG. 5, but the schematic of FIG. 6 shows trigger circuit block 604 including a plurality of discrete trigger circuits. Trigger circuit 621 is configured to detect a voltage event across voltage pins 606 and 612; trigger circuit 622 is configured to detect a voltage event across voltage pins 606 and 608; trigger circuit 623 is configured to detect a voltage event across voltage pins 606 and 610; trigger circuit 624 is configured to detect a voltage event across voltage pins 608 and 612; trigger circuit 625 is configured to detect a voltage event across voltage pins 608 and 610; and trigger circuit 626 is configured to detect a voltage event across voltage pins 610 and 612.

In response to detecting voltage events, any of trigger circuits 621-626 sends a gate control signal to BigMOS 602, and turns BigMOS 602 on so that current flows through BigMOS 602. The gate control signal turns on BigMOS 602 such that current flows from the drain of BigMOS 602 to the source of the BigMOS 602 which is connected to ground. Under normal operating conditions, however, none of trigger circuits 621-626 send a gate control signal to BigMOS 602, and BigMOS 602 is "off" so that very little current flows through BigMOS 502.

As one example, under normal operating conditions, voltage pin 606 receives voltage $V_1$, and voltage pin 612 receives voltage GND, meaning the voltage across voltage pins 606 and 614 is $V_1$-GND. Circuit 600 may include portions of functional circuitry (not shown in FIG. 6) that operate at a voltage of $V_1$-GND. When the voltage across voltage pins 606 and 612 is $V_1$-GND, then trigger circuit 621 does not detect an overvoltage and does not send a gate signal to turn on BigMOS 602. If, however, an ESD event occurs at voltage pins 606 and 612, then the voltage across voltage pins 606 and 612 may be higher than $V_1$-GND, in which case trigger circuit 621 detects the overvoltage condition and sends a gate control signal to BigMOS 602, which turns on BigMOS 602. When BigMOS 602 is on, current caused by the overvoltage condition flows through BigMOS 602 to ground as opposed to flowing through functional circuitry, which could potentially damage the functional circuitry.

In a separate example, under normal operating conditions, voltage pin 608 receives voltage $V_2$, and voltage pin 610 receives voltage $V_N$, meaning the voltage across voltage pins 608 and 610 is $V_2$-$V_N$. Circuit 600 may include portions of functional circuitry (not shown in FIG. 6) that operate at a voltage of $V_2$-$V_N$. When the voltage across voltage pins 608 and 610 is $V_2$-$V_N$, then trigger circuit 625 does not detect an overvoltage and does not send a gate signal to turn on BigMOS 602. If, however, an ESD event occurs at voltage pins 608 and 610, then the voltage across voltage pins 608 and 610 may be much higher than $V_2$-$V_N$, in which case trigger circuit 625 detects the overvoltage condition and sends a gate control signal to BigMOS 602, which turns on BigMOS 602. When BigMOS 602 is on, current caused by the overvoltage condition flows through diode 616 and through BigMOS 602 to ground and through diode 618 to $V_N$ as opposed to flowing through functional circuitry, which could potentially damage the functional circuitry. Trigger circuit 622, trigger circuit 623, trigger circuit 624, and trigger circuit 626 generally behave in the manner described above relative to trigger circuit 621 and trigger circuit 625.

Figure 7:
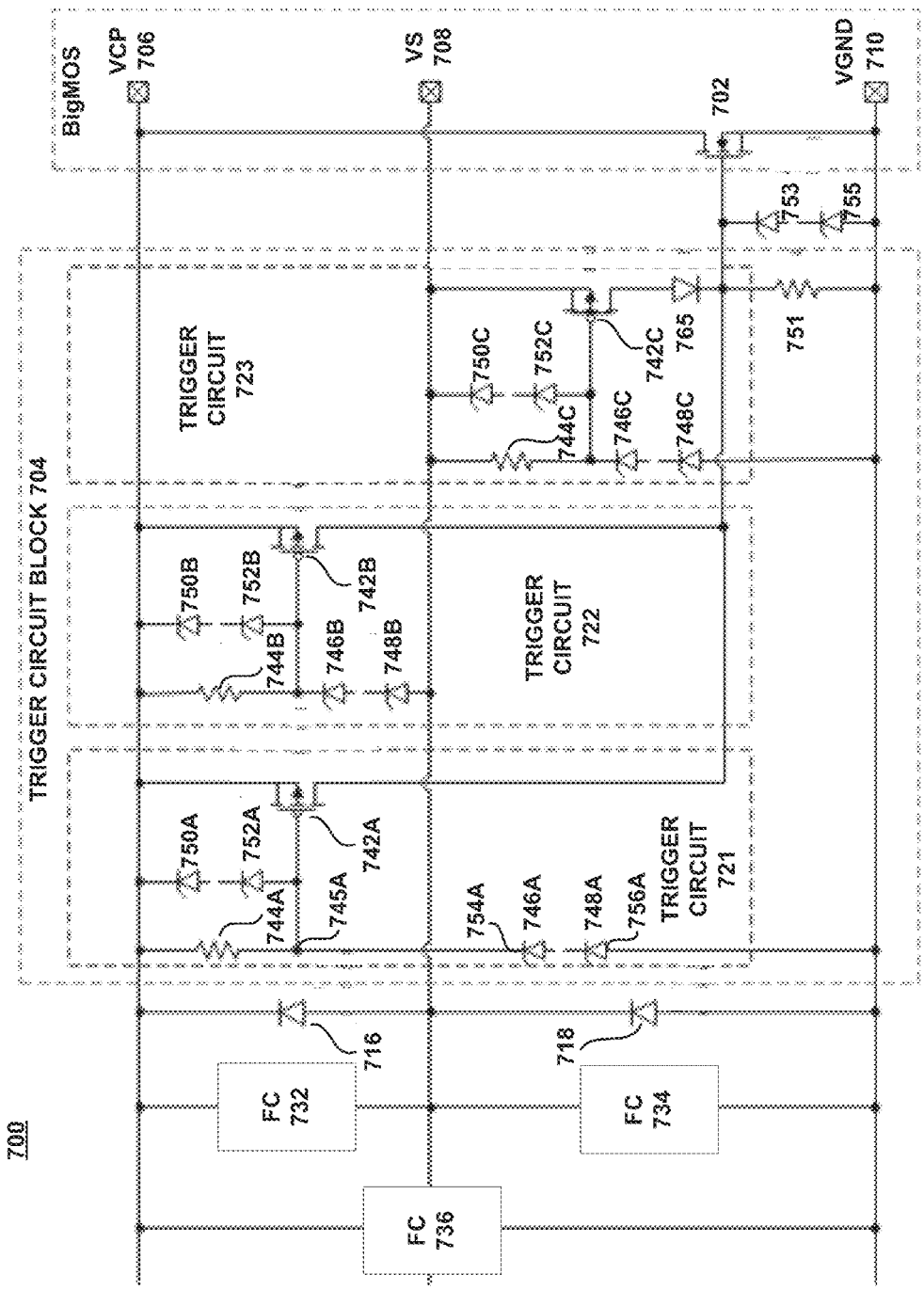
FIG. 7 shows an example of a circuit that includes ESD protection in accordance with the techniques of this disclosure.

FIG. 7 shows circuit 700, which includes ESD protection in accordance with the techniques of this disclosure. Circuit 700 includes BigMOS 702, trigger circuit block 704, and voltage pins 706, 708, and 710. Circuit 700 also includes diode 716 and diode 718, which are forward-biased diodes. Trigger circuit block 704 includes trigger circuit 721, trigger circuit 722, trigger circuit 723, and resistor 751. Circuit 700 also includes functional circuitry (labeled FC in the FIGS.) 732, functional circuitry 734, and functional circuitry 736. The ESD protection implemented in circuit 700 is configured to protect functional circuitry 732, functional circuitry 734, and functional circuitry 736.

FIG. 7 also shows gate protection circuitry that includes a stack of Zener diodes (e.g. diodes 753 and 755 in FIG. 7) aligned in a serial configuration between the gate and source of BigMOS 702. The stack of Zener diodes limits the voltage between the gate and source (and hence limits the voltage across the gate oxide of BigMOS 702) to approximately the sum of the breakdown voltage of the Zener diodes. This voltage limitation can ensures safe operating conditions for the BigMOS gate oxide during normal functional operation as well as during ESD stress events. Other implementations of gate circuitry for circuit 700 may include more or fewer Zener diodes, and some implementations of circuit 700 may not include gate protection circuitry. In general, gate protection as described with relation to FIG. 7 may also be included in the circuits of FIGS. 8-11. Thus, to the extent gate protection is shown in the circuits of FIGS. 8-11, it can be assumed that the gate protection circuitry operates in the same manner as described in relation to FIG. 7.

In the example of FIG. 7, voltage pin 706 is configured to receive voltage VCP; voltage pin 708 is configured to receive voltage VS; and voltage pin 710 is configured to receive voltage GND. In the example of FIG. 7, BigMOS 702 may be an n-type lateral DMOS transistor. A drain of BigMOS 702 is connected to the highest voltage input pin of circuit 700, which is voltage pin 706 in the example of FIG. 7, and a source of BigMOS 702 is connected to the lowest voltage input pin of circuit 700, which is voltage pin 710 in the example of FIG. 7. Voltage VS may be any voltage between VCP and GND. For purposes of example, it may be assumed for FIG. 7 that the following condition holds: VCP>VS>GND. VCP, VS, and GND represent the voltages that voltage pins 706, 708, and 710 are configured to receive under normal operating conditions.

Each of voltage pins 706, 708, and 710 connects to trigger circuit block 704. Trigger circuit block 704 may be configured to detect an overvoltage between any combination of two pins of voltage pins 706, 708, and 710. Trigger circuit block 704 generally behaves in the same manner as trigger circuit blocks 504 and 604 described above with respect to FIGS. 5 and 6 respectively, but the schematic of FIG. 7 shows more detail regarding the implementations of the trigger circuits. In circuit 700, functional circuitry 732 is configured to operate at a voltage of VCP-VS, i.e. the voltage between voltage pin 706 and voltage pin 708. Trigger circuit 722 is configured to detect a voltage event across voltage pins 706 and 708, and thus protect functional circuitry 732. Functional circuitry 734 is configured to operate at a voltage of VS-GND, i.e. the voltage between voltage pin 708 and voltage pin 710. Trigger circuit 723 is configured to detect a voltage event across voltage pins 708 and 710, and thus protect functional circuitry 734. Functional circuitry 736 is configured to operate at a voltage of VCP-GND, i.e. the voltage between voltage pin 706 and voltage pin 710. Trigger circuit 721 is configured to detect a voltage event across voltage pins 706 and 710, and thus protect functional circuitry 736.

In response to detecting voltage events, any of trigger circuits 721-723 sends a gate control signal to BigMOS 702, and turns BigMOS 702 on so that current flows through BigMOS 702. Trigger circuits 721-723 cause BigMos 702 to turn on by creating a gate-to-source voltage across resistor 751 that causes a drain-to-source current to flow through BigMos 702. The gate control signal turns on BigMOS 702 such that current flows from the drain of BigMOS 702 to the source of the BigMOS 702 which is connected to ground. Under normal operating conditions, however, none of trigger circuits 721-723 send a gate control signal to BigMOS 702, and BigMOS 702 is "off" so that very little current flows through BigMOS 702.

As one example, under normal operating conditions, voltage pin 706 receives voltage VCP, and voltage pin 710 receives voltage GND, meaning the voltage across voltage pins 706 and 710 is VCP-GND. For purposes of example, VCP may be 45V and GND may be 0V, meaning VCP-GND is 45V. Functional circuitry 736 may be configured to operate at 45V. When the voltage across voltage pins 706 and 710 is at or close to 45V, then trigger circuit 721 does not detect an overvoltage and does not send a gate signal to turn on BigMOS 702. If, however, an ESD event occurs at voltage pins 706 and 710, then the voltage across voltage pins 706 and 710 may be much higher than 45V, in which case trigger circuit 721 detects the overvoltage condition and sends a gate control signal to BigMOS 702, which turns on BigMOS 702. Trigger circuit 721 may, for example, be configured to detect an overvoltage when the voltage between voltage pins 706 and 710 exceeds 50V. When BigMOS 702 is on, current caused by the more than 70 volts across voltage pins 706 and 710 flows through BigMOS 702 to ground as opposed to flowing through functional circuitry 736, which could potentially damage functional circuitry 736

Trigger circuit 721 includes transistor 742A, resistor 744A, a first stack of Zener diodes (shown in FIG. 7 as diode 746A and diode 748A), and a second stack of Zener diodes (shown in FIG. 7 as diode 750A and diode 752A). In In the example of FIG. 7, transistor 742A may be a p-channel MOSFET with a source of transistor 742A connected to voltage pin 706 and a drain of transistor 742A connected to the gate of BigMOS 702. Diodes 746A and 748A are Zener diodes with one terminal (labeled 754A) of diode 746A connected to a gate of transistor 742A (at node 745A) and one terminal (labeled 756A) of diode 748A connected to ground. One terminal of resistor 744A is connected to voltage pin 706, while the other terminal of resistor 744A is connected, at node 745A, to both the gate of transistor 742A and to terminal 754A of diode 746A. Diodes 750A and 752A are optional gate protection circuitry between the gate and source of transistor 742A. The gate protection circuitry of diodes 750A and 752A generally functions in the same manner as the gate protection circuitry of diodes 753 and 755 described above.

Trigger circuit 722 includes transistor 742B, resistor 744B, a first stack of Zener diodes (shown in FIG. 7 as diode 746B and, diode 748B), and a second stack of Zener diodes (shown in FIG. 7 as diode 750B, and diode 752B). In In the example of FIG. 7, transistor 742B may be a p-channel MOSFET with a source of transistor 742B connected to voltage pin 706 and a drain of transistor 742B connected to the gate of BigMOS 702. Diodes 746B and 748B are Zener diodes with one terminal of diode 746B connected to a gate of transistor 742B and one terminal of diode 748B connected to voltage pin 708. One terminal of resistor 744B is connected to voltage pin 706, while the other terminal of resistor 744B is connected to both the gate of transistor 742B and to a terminal diode 746B. Diodes 750B and 752B are optional gate protection circuitry between the gate and source of transistor 742B. The gate protection circuitry of diodes 750B and 752B generally functions in the same manner as the gate protection circuitry of diodes 753 and 755 described above.

Trigger circuit 723 includes transistor 742C, resistor 744C, a first stack of Zener diodes (shown in FIG. 7 as diode 746C and, diode 748C), and a second stack of Zener diodes (shown in FIG. 7 as diode 750C, and diode 752C). In In the example of FIG. 7, transistor 742C may be a p-channel MOSFET with a source of transistor 742C connected to voltage pin 708 and a drain of transistor 742C connected to the gate of BigMOS 702. Diodes 746C and 748C are Zener diodes with one terminal of diode 746C connected to a gate of transistor 742C and one terminal of diode 748C connected to voltage pin 710. One terminal of resistor 744C is connected to voltage pin 708, while the other terminal of resistor 744C is connected to both the gate of transistor 742C and to a terminal diode 746C. Diodes 750C and 752C are optional gate protection circuitry between the gate and source of transistor 742C. The gate protection circuitry of diodes 750C and 752C generally functions in the same manner as the gate protection circuitry of diodes 753 and 755 described above. Trigger circuit 723 also includes diode 765 to prevent an unwanted current path from the gate of BigMOS 702, which may prevent the turn on of BigMOS 702.

As introduced above, trigger circuit 721 is configured to detect an overvoltage across voltage pins 706 and 710. When the voltage at node 745A is below a threshold level, no current flows from the source of transistor 742A to the drain of transistor 742A. When no current flows through transistor 742A, no gate signal is present at the gate of BigMOS 702 to turn on BigMOS 702. When the voltage at node 745A is above a threshold level, current flows from the source of transistor 742A to the drain of transistor 742A causing a gate signal to be present at the gate of BigMOS 702, which causes BigMOS 702 to turn on. Thus, trigger circuit 721 is configured to produce a voltage at 745A that is below the threshold level during normal operation but is above the threshold level when an overvoltage is present.

As introduced above, diodes 746A and 748A represent a stack of Zener diodes. The stack of Zener diodes represented by diodes 746A and 748A, as well as other stacks of Zener diodes mentioned in this disclosure, may in fact include more than just the two diodes shown. The diodes in a stack of Zener diodes can be used to define the breakdown voltage for the stack. As one example, assume a Zener diode has a reverse breakdown voltage of 8V and a forward voltage of 0.7V, then to achieve a breakdown voltage of 32.7V, a stack of Zener diodes that includes four reversed-biased direction Zener diodes and one forward-biased direction diode may be used.

When the voltage drop across diodes 746A and 748A (i.e. the stack of Zener diodes represented by diodes 746A and 748A) in the forward direction (i.e. from terminal 756A to 754A) is positive, then diodes 746A and 748A conduct electricity. When the voltage drop across diodes 746A and 748A is positive in the reverse direction (i.e. from terminal 754A to 756A) but less than the breakdown voltage, then diodes 746A and 748A do not conduct electricity. When the voltage drop across diodes 746A and 748A is positive in the reverse direction and greater than the breakdown voltage, then diodes 746A and 748A conduct electricity. Thus, diodes 746A and 748A are selected such that normal voltages do not result in reversed-biased current flow while overvoltages do result in reversed biased current flow. Additionally, the resistance value of resistor 744A is selected such that when the voltage across voltage pins 706 and 710 exceeds VCP-GND by a certain amount, that the voltage drop across resistor 744A caused by the reverse-biases current flowing through diodes 746A and 748A produces a voltage at node 745A that is above the threshold value that causes transistor 742A to transmit current.

In another example, under normal operating conditions, voltage pin 708 receives voltage VS, and voltage pin 710 receives voltage GND, meaning the voltage across voltage pins 708 and 710 is VS-GND. For purposes of example, VCP can be assumed to be 30V, and the voltage GND can be assumed to be 0V, meaning the voltage VS-GND is 30V. Circuit 700 includes functional circuitry 734 that may operate at 30V. When the voltage across voltage pins 708 and 710 is at or close to 30V, then trigger circuit 723 does not detect an overvoltage and does not send a gate signal to turn on BigMOS 702. If, however, an ESD event occurs at voltage pins 708 and 710, then the voltage across voltage pins 708 and 710 may be much higher than 30V, in which case trigger circuit 723 detects the overvoltage condition and sends a gate control signal to BigMOS 702, which turns on BigMOS 702. Trigger circuit 723 may, for example, be configured to detect an overvoltage when the voltage across voltage pin 708 and voltage pin 710 exceeds 34V. When BigMOS 702 is on, current caused by the overvoltage condition flows through diode 716 and through BigMOS 702 to ground as opposed to flowing through functional circuitry 734, which could potentially damage functional circuitry 734.

In another example, using the voltage values given above, under normal operating conditions, voltage pin 706 receives voltage VCP (45V) and voltage pin 708 receives voltage VS (30V), meaning the voltage across voltage pins 706 and 708 is 15V. Circuit 700 includes functional circuitry 732 that may operate at 15V. When the voltage across voltage pins 706 and 708 is at or close to 15V, then trigger circuit 722 does not detect an overvoltage and does not send a gate signal to turn on BigMOS 702. If, however, an ESD event occurs at voltage pins 706 and 708, then the voltage across voltage pins 706 and 708 may be much higher than 15V, in which case trigger circuit 722 detects the overvoltage condition and sends a gate control signal to BigMOS 702, which turns on BigMOS 702. Trigger circuit 722 may, for example, be configured to detect an overvoltage when the voltage across voltage pin 706 and voltage pin 708 exceeds 18V. When BigMOS 702 is on, current caused by the overvoltage condition flows through BigMOS 702 to ground and through diode 716 to VS as opposed to flowing through functional circuitry 732, which could potentially damage functional circuitry 732.

Trigger circuit 722 and trigger circuit 723 generally operate according to the same principles described above with respect to trigger circuit 721. In this regards, the components of trigger circuits 722 and 723 function in the same manner as their corresponding components in trigger circuit 721. For example, transistor 742B and transistor 742C function in the same manner as transistor 742A described above, Zener diodes 746B and 748B and Zener diodes 746C and 748C function in the same manner described above for Zener diodes 746A and 748A, and so on.

Figure 8:
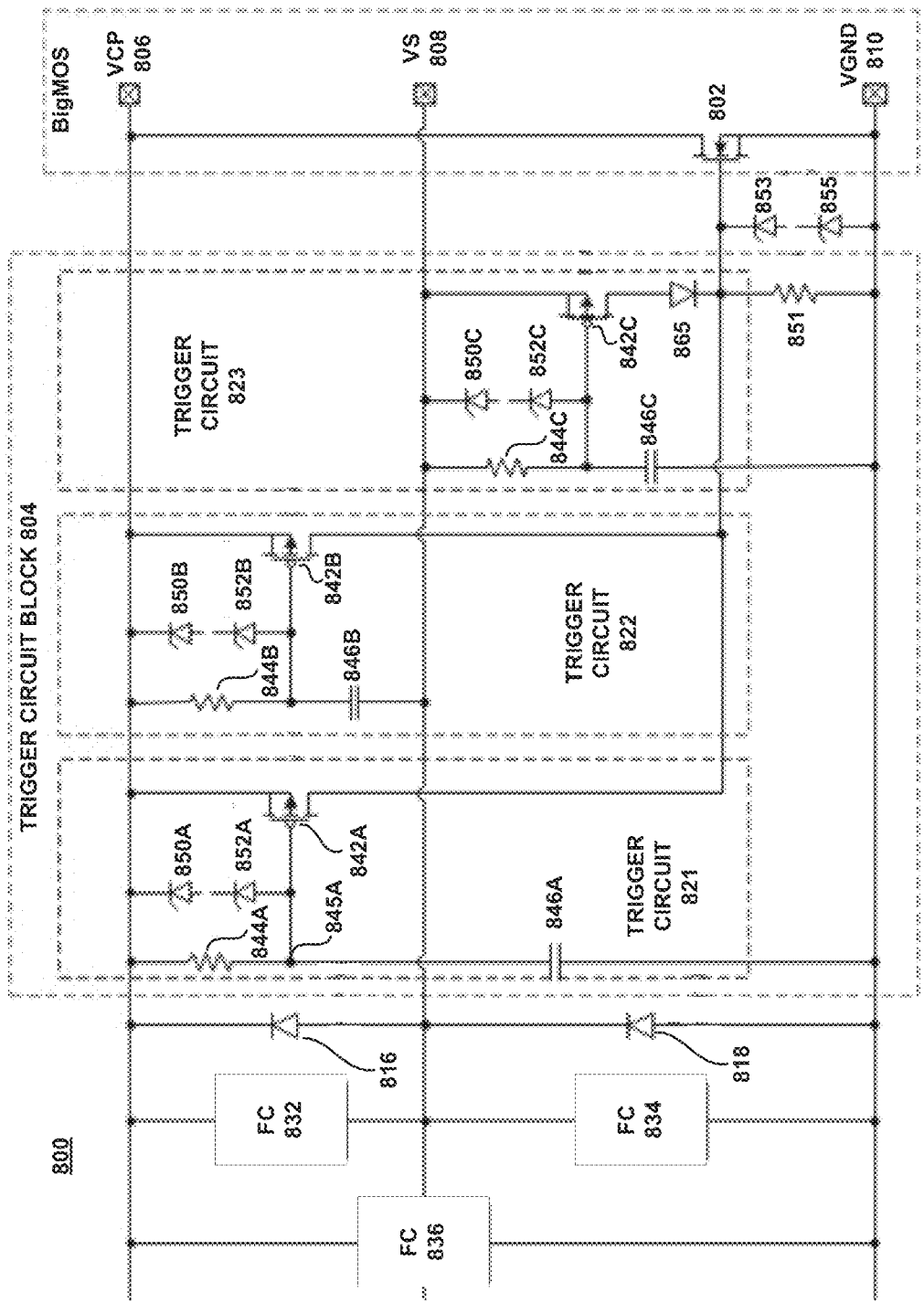
FIG. 8 shows an example of a circuit that includes ESD protection in accordance with the techniques of this disclosure.

FIG. 8 shows circuit 800, which includes ESD protection in accordance with the techniques of this disclosure. Circuit 800 includes BigMOS 802, trigger circuit block 804, and voltage pins 806, 808, and 810. Circuit 800 also includes diode 816 and diode 818, which are forward-biased diodes. Trigger circuit block 804 includes trigger circuit 821, trigger circuit 822, trigger circuit 823, and resistor 851. Circuit 800 also includes functional circuitry 832, functional circuitry 834, and functional circuitry 836. The ESD protection implemented in circuit 800 is configured to protect functional circuitry 832, functional circuitry 834, and functional circuitry 836. Circuit 800 generally behaves in the same manner as circuit 700 described above, but trigger circuits 821-823 are RC-trigger circuits configured to detect voltage spikes whereas trigger circuits 721-723 are configured to detect overvoltages. FIG. 8 also shows gate protection circuitry that includes a stack of Zener diodes (e.g. diodes 853 and 855 in FIG. 8) aligned in a serial configuration between the gate and source of BigMOS 802.

A circuit in accordance with the techniques of this disclosure may include trigger circuits for detecting one of voltage spikes or over voltages or may include trigger circuits for detecting both voltage spikes and over voltages. Accordingly, it is contemplated that the techniques for detecting voltage spikes described in relation to FIG. 8 may be implemented in conjunction with the trigger circuits for detecting over voltages described in relation to FIG. 7 and elsewhere. When trigger circuits for detecting both voltage spikes and over voltages are implemented in a circuit, it is contemplated that the over voltage and voltage spike trigger circuits may turn on the same big switch. Thus, although different trigger circuits may be used for detecting over voltages and voltage spikes, the ESD discharge paths used to discharge the resulting ESD current may be the same.

In the example of FIG. 8, voltage pin 806 is configured to receive voltage VCP; voltage pin 808 is configured to receive voltage VS; and voltage pin 810 is configured to receive voltage GND. A drain of BigMOS 802 is connected to the highest voltage input pin of circuit 800, which is voltage pin 806 in the example of FIG. 8, and a source of BigMOS 802 is connected to the lowest voltage input pin of circuit 800, which is voltage pin 810 in the example of FIG. 8. Voltage VS may be any voltage between VCP and GND. For purposes of example, it may be assumed for FIG. 8 that the following condition holds: VCP>VS>GND. VCP, VS, and GND represent the voltages that voltage pins 806, 808, and 810 are configured to receive under normal operating conditions.

Each of voltage pins 806, 808, and 810 connects to trigger circuit block 804. Trigger circuit block 804 may be configured to detect a voltage spike between any combination of two pins of voltage pins 806, 808, and 810. Trigger circuit block 804 generally behaves in the same manner as trigger circuit blocks 704 described above with respect to FIG. 7, but as previously mentioned, trigger circuit block 804 is configured to turn on BigMOS 802 in response to detecting a voltage spike as opposed to an overvoltage. In circuit 800, functional circuitry 832 is configured to operate at a voltage of VCP-VS, i.e. the voltage between voltage pin 806 and voltage pin 808. Trigger circuit 822 is configured to detect a voltage spike across voltage pins 806 and 808, and thus protect functional circuitry 832. Functional circuitry 834 is configured to operate at a voltage of VS-GND, i.e. the voltage between voltage pin 808 and voltage pin 810. Trigger circuit 823 is configured to detect a voltage spike across voltage pins 808 and 810, and thus protect functional circuitry 834. Functional circuitry 836 is configured to operate at a voltage of VCP-GND, i.e. the voltage between voltage pin 806 and voltage pin 810. Trigger circuit 821 is configured to detect a voltage spike across voltage pins 806 and 810, and thus protect functional circuitry 836.

In response to detecting a voltage spike, any of trigger circuits 821-823 sends a gate control signal to BigMOS 802, and turns BigMOS 802 on so that current flows through BigMOS 802. Trigger circuits 821-823 cause BigMos 802 to turn on by creating a gate-to-source voltage across resistor 851 that causes a drain-to-source current to flow through BigMos 802. The gate control signal turns on BigMOS 802 such that current flows from the drain of BigMOS 802 to the source of the BigMOS 802 which is connected to ground. Under normal operating conditions, however, none of trigger circuits 821-823 send a gate control signal to BigMOS 802, and BigMOS 802 is "off" so that very little current flows through BigMOS 802.

As one example, under normal operating conditions, voltage pin 806 receives voltage VCP, and voltage pin 810 receives voltage GND, meaning the voltage across voltage pins 806 and 810 is VCP-GND. Functional circuitry 836 is configured to operate at a voltage of VCP-GND. When the voltage across voltage pins 806 and 810 is relatively steady at VCP-GND or increases at a rate that is consistent with normal circuit operation, such as during power up, then trigger circuit 821 does not detect a voltage spike and does not send a gate signal to turn on BigMOS 802. If, however, an ESD event occurs at voltage pins 806 and 810, then the voltage across voltage pins 806 and 810 may rapidly spike, in which case trigger circuit 821 detects the voltage spike and sends a gate control signal to BigMOS 802, which turns on BigMOS 802. When BigMOS 802 is on, current caused by the overvoltage condition flows through BigMOS 802 to ground as opposed to flowing through functional circuitry 836, which could potentially damage functional circuitry 836

Trigger circuit 821 includes transistor 842A, resistor 844A, capacitor 846A, diode 850A, and diode 852A. In In the example of FIG. 8, transistor 842A may be a p-channel MOSFET with a source of transistor 842A connected to voltage pin 806 and a drain of transistor 842A connected to the gate of BigMOS 802. Capacitor 846A has one terminal connected to a gate of transistor 842A (at node 845A) and one terminal connected to ground. One terminal of resistor 844A is connected to voltage pin 806, while the other terminal of resistor 844A is connected, at node 845A, to both the gate of transistor 842A and to a terminal of capacitor 846A.

Trigger circuit 822 includes transistor 842B, resistor 844B, capacitor 846B, diode 850B, and diode 852B. In the example of FIG. 8, transistor 842B may be a p-channel MOSFET with a source of transistor 842B connected to voltage pin 806 and a drain of transistor 842A connected to the gate of bigMOS-BigMOS 802. Capacitor 846B has one terminal connected to a gate of transistor 842B and one terminal connected to voltage pin 808. One terminal of resistor 844B is connected to voltage pin 806, while the other terminal of resistor 844B is connected to both the gate of transistor 842B and to a terminal of capacitor 846B.

Trigger circuit 823 includes transistor 842C, resistor 844C, capacitor 846C, diode 850C, and diode 852C. In the example of FIG. 8, transistor 842C may be a p-channel MOSFET with a source of transistor 842C connected to voltage pin 808 and a drain of transistor 842C connected to the gate of bigMOS-BigMOS 802. Capacitor 846C has one terminal connected to a gate of transistor 842C and one terminal connected to voltage pin 810. One terminal of resistor 844C is connected to voltage pin 808, while the other terminal of resistor 844C is connected to both the gate of transistor 842C and to a terminal of capacitor 846C. Trigger circuit 823 also includes diode 865 to prevent an unwanted current path from the gate of BigMOS 802, which may prevent the turn on of BigMOS 802.

As introduced above, trigger circuit 821 is configured to detect a voltage spike across voltage pins 806 and 810. When the voltage at node 845A is below a threshold level, no current flows from the source of transistor 842A to the drain of transistor 842A. When no current flows through transistor 842A, no gate signal is present at the gate of BigMOS 802 to turn on BigMOS 802. When the voltage at node 845A is above a threshold level, current flows from the source of transistor 842A to the drain of transistor 842A causing a gate signal to be present at the gate of BigMOS 802, which causes BigMOS 802 to turn on. Thus, trigger circuit 821 is configured to produce a voltage at 845A that is below the threshold level during normal operation but is above the threshold level when a voltage spike occurs.

In response to a voltage spike occurring between pin 806 and pin 810, the voltage at node 845A does not immediately follow the voltage at pin 806 due to the presence of capacitor 846A. Transistor 842A turns on causing current to flow through transistor 842A, which turns on BigMos 802. The ESD current is then conducted by BigMOS 802 from pin 806 to pin 810. After a certain time period defined by the RC-time constant of resistor 844A and capacitor 846A (e.g. 300 ns) after the ESD event, node 845A will be discharged to the same potential as voltage pin 806 via the resistor 844A. Transistor 842A turns off resulting in the turn-off of BigMOS 802. Trigger circuits 822 and 823 are generally configured to operate in the same manner as described for trigger circuit 821.

In another example, under normal operating conditions, voltage pin 808 receives voltage VS, and voltage pin 810 receives voltage GND, meaning the voltage across voltage pins 808 and 810 is VCP-GND. Circuit 800 includes functional circuitry 834 that operate at a voltage of VCP-GND. When the voltage across voltage pins 808 and 810 is relatively steady at VCP-GND or increases at a rate that is consistent with normal operation, then trigger circuit 823 does not detect a voltage spike and does not send a gate signal to turn on BigMOS 802. If, however, an ESD event occurs at voltage pins 808 and 810, then the voltage across voltage pins 808 and 810 may rapidly spike, in which case trigger circuit 823 detects the overvoltage condition and sends a gate control signal to BigMOS 802, which turns on BigMOS 802. When BigMOS 802 is on, current caused by the overvoltage condition flows through diode 816 and through BigMOS 802 to ground as opposed to flowing through functional circuitry 834, which could potentially damage functional circuitry 834. Trigger circuit 822 generally behaves in the manner described above relative to trigger circuit 821 and trigger circuit 823.

Figure 9:
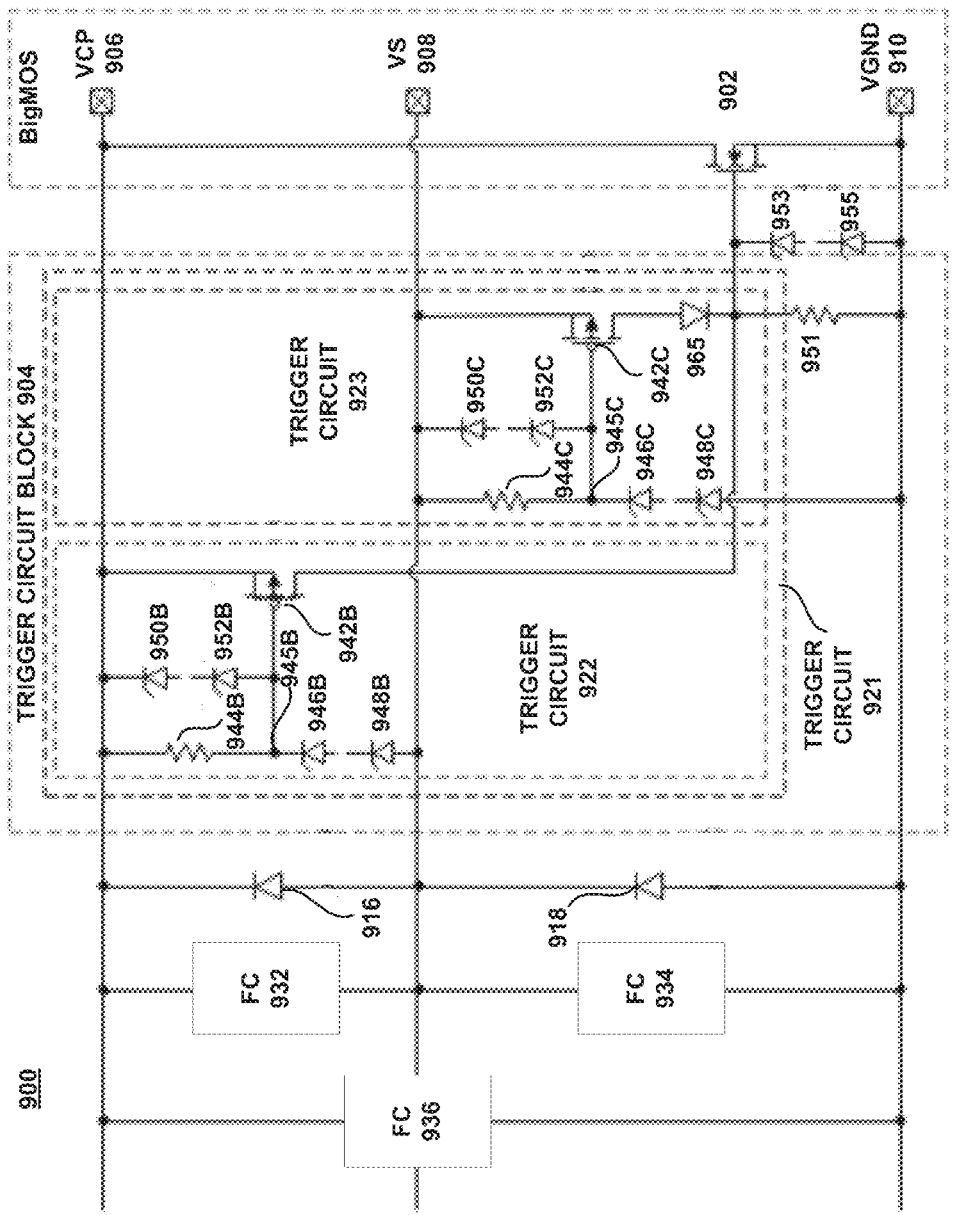
FIG. 9 shows an example of a circuit that includes ESD protection in accordance with the techniques of this disclosure.

FIG. 9 shows circuit 900, which includes ESD protection in accordance with the techniques of this disclosure. Circuit 900 includes BigMOS 902, trigger circuit block 904, and voltage pins 906, 908, and 910. Circuit 900 also includes diode 916 and diode 918, which are forward-biased diodes. Trigger circuit block 904 includes trigger circuit 921, trigger circuit 922 and trigger circuit 923, and resistor 951. The dotted lines labeled as trigger circuit 921 is intended to convey that trigger circuit 921 is a combination of trigger circuit 922 and trigger circuit 923. Circuit 900 also includes functional circuitry 932, functional circuitry 934, and functional circuitry 936. The ESD protection implemented in circuit 900 is configured to protect functional circuitry 932, functional circuitry 934, and functional circuitry 936. FIG. 9 also shows gate protection circuitry that includes a stack of Zener diodes (e.g. diodes 953 and 955 in FIG. 9) aligned in a serial configuration between the gate and source of BigMOS 802.

In the example of FIG. 9, voltage pin 906 is configured to receive voltage VCP; voltage pin 908 is configured to receive voltage VS; and voltage pin 910 is configured to receive voltage GND. In the example of FIG. 9, BigMOS 902 may be an n-type lateral DMOS transistor. A drain of BigMOS 902 is connected to the highest voltage input pin of circuit 900, which is voltage pin 906 in the example of FIG. 9, and a source of BigMOS 902 is connected to the lowest voltage input pin of circuit 800, which is voltage pin 910 in the example of FIG. 9. Voltage VS may be any voltage between VCP and GND. For purposes of example, it may be assumed for FIG. 9 that the following condition holds: VCP>VS>GND. VCP, VS, and GND represent the voltages that voltage pins 906, 908, and 910 are configured to receive under normal operating conditions.

Each of voltage pins 906, 908, and 910 connects to trigger circuit block 904. Trigger circuit block 904 may be configured to detect an overvoltage between any combination of two pins of voltage pins 906, 908, and 910. Trigger circuit block 904 generally behaves in the same manner as trigger circuit blocks 504 and 604 described above with respect to FIGS. 5 and 6 respectively, but the schematic of FIG. 9 shows more detail regarding the implementations of the trigger circuits. In circuit 900, functional circuitry 932 is configured to operate at a voltage of VCP-VS, i.e. the voltage between voltage pin 906 and voltage pin 908. Trigger circuit 922 is configured to detect a voltage event across voltage pins 906 and 908, and thus protect functional circuitry 932. Functional circuitry 934 is configured to operate at a voltage of VS-GND, i.e. the voltage between voltage pin 908 and voltage pin 910. Trigger circuit 923 is configured to detect a voltage event across voltage pins 908 and 910, and thus protect functional circuitry 934. Functional circuitry 936 is configured to operate at a voltage of VCP-GND, i.e. the voltage between voltage pin 906 and voltage pin 910. Trigger circuit 921 is configured to detect a voltage event across voltage pins 906 and 910, and thus protect functional circuitry 936.

In response to detecting voltage events, any of trigger circuits 921-923 sends a gate control signal to BigMOS 902, and turns BigMOS 902 on so that current flows through BigMOS 902. Trigger circuits 921-923 cause BigMos 902 to turn on by creating a gate-to-source voltage across resistor 951 that causes a drain-to-source current to flow through BigMos 902. The gate control signal turns on BigMOS 902 such that current flows from the drain of BigMOS 902 to the source of the BigMOS 902 which is connected to ground. Under normal operating conditions, however, none of trigger circuits 921-923 send a gate control signal to BigMOS 902, and BigMOS 902 is "off" so that very little current flows through BigMOS 902.

In one example, voltage pin 906 receives voltage VCP and voltage pin 908 receives voltage VS, meaning the voltage across voltage pins 906 and 908 is VCP-VS. Circuit 900 includes functional circuitry 932 that may operate at a voltage of VCP-VS. When the voltage across voltage pins 906 and 908 is at or close to VCP-VS, then trigger circuit 922 does not detect an overvoltage and does not send a gate signal to turn on BigMOS 902. If, however, an ESD event occurs at voltage pins 906 and 908, then the voltage across voltage pins 906 and 908 may be much higher than VCP-VS, in which case trigger circuit 922 detects the overvoltage condition and sends a gate control signal to BigMOS 902, which turns on BigMOS 902. When BigMOS 902 is on, current caused by the overvoltage condition flows through BigMOS 902 to ground and through diode 916 to VS as opposed to flowing through functional circuitry 932, which could potentially damage functional circuitry 932.

Trigger circuit 922 includes transistor 942B, resistor 944B, a stack of Zener diodes (shown in FIG. 9 as diode 946B and diode 948B), diode 950B, and diode 952B. In In the example of FIG. 9, transistor 942B may be a p-channel MOSFET with a source of transistor 942B connected to voltage pin 906 and a drain of transistor 942B connected to the gate of BigMOS 902. Diodes 946B and 948B are Zener diodes with one terminal (labeled 954B) of diode 946B connected to a gate of transistor 942B (at node 945B) and one terminal (labeled 956B) of diode 948B connected to voltage pin 908. One terminal of resistor 944B is connected to voltage pin 906, while the other terminal of resistor 944B is connected, at node 945B, to both the gate of transistor 942B and to terminal 954B of diode 946B.

As introduced above, trigger circuit 922 is configured to detect an overvoltage across voltage pins 906 and 908. When the voltage at node 945B is below a threshold level, no current flows from the source of transistor 942B to the drain of transistor 942B. When no current flows through transistor 942B, no gate signal is present at the gate of BigMOS 902 to turn on BigMOS 902. When the voltage at node 945B is above a threshold level, current flows from the source of transistor 942B to the drain of transistor 942B causing a gate signal to be present at the gate of BigMOS 902, which causes BigMOS 902 to turn on. Thus, trigger circuit 922 is configured to produce a voltage at 945B that is below the threshold level during normal operation but is above the threshold level when an overvoltage is present.

As introduced above, diodes 946B and 948B are Zener diodes. When the voltage drop across diodes 946B and 948B in the forward direction is positive, then diodes 946B and 948B conduct electricity. When the voltage drop across diodes 946B and 948B is positive in the reverse direction but less than the breakdown voltage, then diodes 946B and 948B do not conduct electricity. When the voltage drop across diodes 946B and 948B is positive in the reverse direction and greater than the breakdown voltage, then diodes 946B and 948B conduct electricity. Thus, diodes 946B and 948B are selected such that normal voltages do not result in reversed-biased current flow while overvoltages do result in reversed biased current flow. Additionally, the resistance value of resistor 944B is selected such that when the voltage across voltage pins 906 and 908 exceeds VCP-VS by a certain amount, that the voltage drop across resistor 944B caused by the reverse-biases current flowing through diodes 946B and 948B produces a voltage at node 945B that is above the threshold value that causes transistor 942B to transmit current.

In one example, under normal operating conditions, voltage pin 908 receives voltage VS, and voltage pin 910 receives voltage GND, meaning the voltage across voltage pins 908 and 910 is VS-GND. Circuit 900 includes functional circuitry 934 that may operate at a voltage of VS-GND. When the voltage across voltage pins 908 and 910 is at or close to VS-GND, then trigger circuit 923 does not detect an overvoltage and does not send a gate signal to turn on BigMOS 902. If, however, an ESD event occurs at voltage pins 908 and 910, then the voltage across voltage pins 908 and 910 may be much higher than VS-GND, in which case trigger circuit 923 detects the overvoltage condition and sends a gate control signal to BigMOS 902, which turns on BigMOS 902. When BigMOS 902 is on, current caused by the overvoltage condition flows through diode 916 and through BigMOS 902 to ground as opposed to flowing through functional circuitry 934, which could potentially damage functional circuitry 934.

Trigger circuit 923 generally includes the same components and is configured to operate in the same manner as trigger circuit 922 described above. Trigger circuit 923 includes transistor 942C, resistor 944C, a stack of Zener diodes (shown in FIG. 9 as diode 946C and diode 948C), diode 950C, and diode 952C. In the example of FIG. 9, transistor 942C may be a p-channel MOSFET with a source of transistor 942C connected to voltage pin 908 and a drain of transistor 942C connected to the gate of BigMOS 902. Diodes 946C and 948C are Zener diodes with one terminal of diode 946C connected to a gate of transistor 942C and one terminal of diode 948C connected to voltage pin 908. One terminal of resistor 944C is connected to voltage pin 908, while the other terminal of resistor 944C is connected, at node 945C, to both the gate of transistor 942C and to terminal 954C of diode 946C.

Trigger circuit 923 is configured to detect an overvoltage across voltage pins 908 and 910. When the voltage at node 945C is below a threshold level, no current flows from the source of transistor 942C to the drain of transistor 942C. When no current flows through transistor 942C, no gate signal is present at the gate of BigMOS 902 to turn on BigMOS 902. When the voltage at node 945C is above a threshold level, current flows from the source of transistor 942C to the drain of transistor 942C causing a gate signal to be present at the gate of BigMOS 902, which causes BigMOS 902 to turn on. Thus, trigger circuit 923 is configured to produce a voltage at 945C that is below the threshold level during normal operation but is above the threshold level when an overvoltage is present.

Diodes 946C and 948C may comprise Zener diodes. When the voltage drop across diodes 946B and 948B in the forward direction is positive, then diodes 946C and 948C conduct electricity. When the voltage drop across diodes 946C and 948C is positive in the reverse direction but less than the breakdown voltage, then diodes 946C and 948C do not conduct electricity. When the voltage drop across diodes 946C and 948C is positive in the reverse direction and greater than the breakdown voltage, then diodes 946C and 948C conduct electricity. Thus, diodes 946C and 948C are selected such that normal voltages do not result in reversed-biased current flow while overvoltages do result in reversed biased current flow. Additionally, the resistance value of resistor 944C is selected such that when the voltage across voltage pins 908 and 910 exceeds VS-GND by a certain amount, that the voltage drop across resistor 944C caused by the reverse-biases current flowing through diodes 946C and 948C produces a voltage at node 945C that is above the threshold value that causes transistor 942C to transmit current.

As another example, under normal operating conditions, voltage pin 906 receives voltage VCP, and voltage pin 910 receives voltage GND, meaning the voltage across voltage pins 906 and 910 is VCP-GND. Functional circuitry 936 may be configured to operate at VCP-GND. When the voltage across voltage pins 906 and 910 is at or close to VCP-GND, then trigger circuit 921 does not detect an overvoltage and does not send a gate signal to turn on BigMOS 902. If, however, an ESD event occurs at voltage pins 906 and 910, then the voltage across voltage pins 906 and 910 may be much higher than VCP-GND, in which case trigger circuit 921 detects the overvoltage condition and sends a gate control signal to BigMOS 902, which turns on BigMOS 902. When BigMOS 902 is on, current caused by the overvoltage across voltage pins 906 and 910 flows through BigMOS 902 to ground as opposed to flowing through functional circuitry 936, which could potentially damage functional circuitry 936.

As mentioned above, trigger circuit 921 is formed by a combination of trigger circuit 922 and trigger circuit 923. Trigger circuit 921 is configured to detect an overvoltage across voltage pins 906 and 910. When the voltage at node 945C is below a threshold level, no current flows from the source of transistor 942C to the drain of transistor 942C. When no current flows through transistor 942C, no gate signal is present at the gate of BigMOS 902 to turn on BigMOS 902. When the voltage at node 945C is above a threshold level, current flows from the source of transistor 942C to the drain of transistor 942C causing a gate signal to be present at the gate of BigMOS 902, which causes BigMOS 902 to turn on. Thus, trigger circuit 921 is configured to produce a voltage at 945C that is below the threshold level during normal operation but is above the threshold level when an overvoltage is present.

Diodes 946B, 948B, 946C and 948C may comprise Zener diodes. When the voltage drop across diodes 946B, 948B, 946C and 948C in the forward direction is positive, then diodes 946B, 948B, 946C and 948C conduct electricity. When the voltage drop across diodes 946B, 948B, 946C and 948C is positive in the reverse direction but less than the breakdown voltage, then diodes 946B, 948B, 946C and 948C do not conduct electricity. When the voltage drop across diodes 946B, 948B, 946C and 948C is positive in the reverse direction and greater than the breakdown voltage, then diodes 946B, 948B, 946C and 948C conduct electricity. Thus, diodes 946B, 948B, 946C and 948C are selected such that normal voltages do not result in reversed-biased current flow while overvoltages do result in reversed biased current flow. Additionally, the resistance value of resistor 944C may be selected such that when the voltage across voltage pins 906 and 910 exceeds VCP-GND by a certain amount, that the voltage drop across resistor 944C caused by the reverse-biases current flowing through diodes 946B, 948B, 946C and 948C produces a voltage at node 945C that is above the threshold value that causes transistor 942C to transmit current. Additionally, the resistance value of resistor 944B may be selected such that when the voltage across voltage pins 906 and 910 exceeds VCP-GND by a certain amount, that the voltage drop across resistor 944B caused by the reverse-biases current flowing through diodes 946B, 948B, 946C and 948C produces a voltage at node 945B that is above the threshold value that causes transistor 942B to transmit current.

Figure 10:
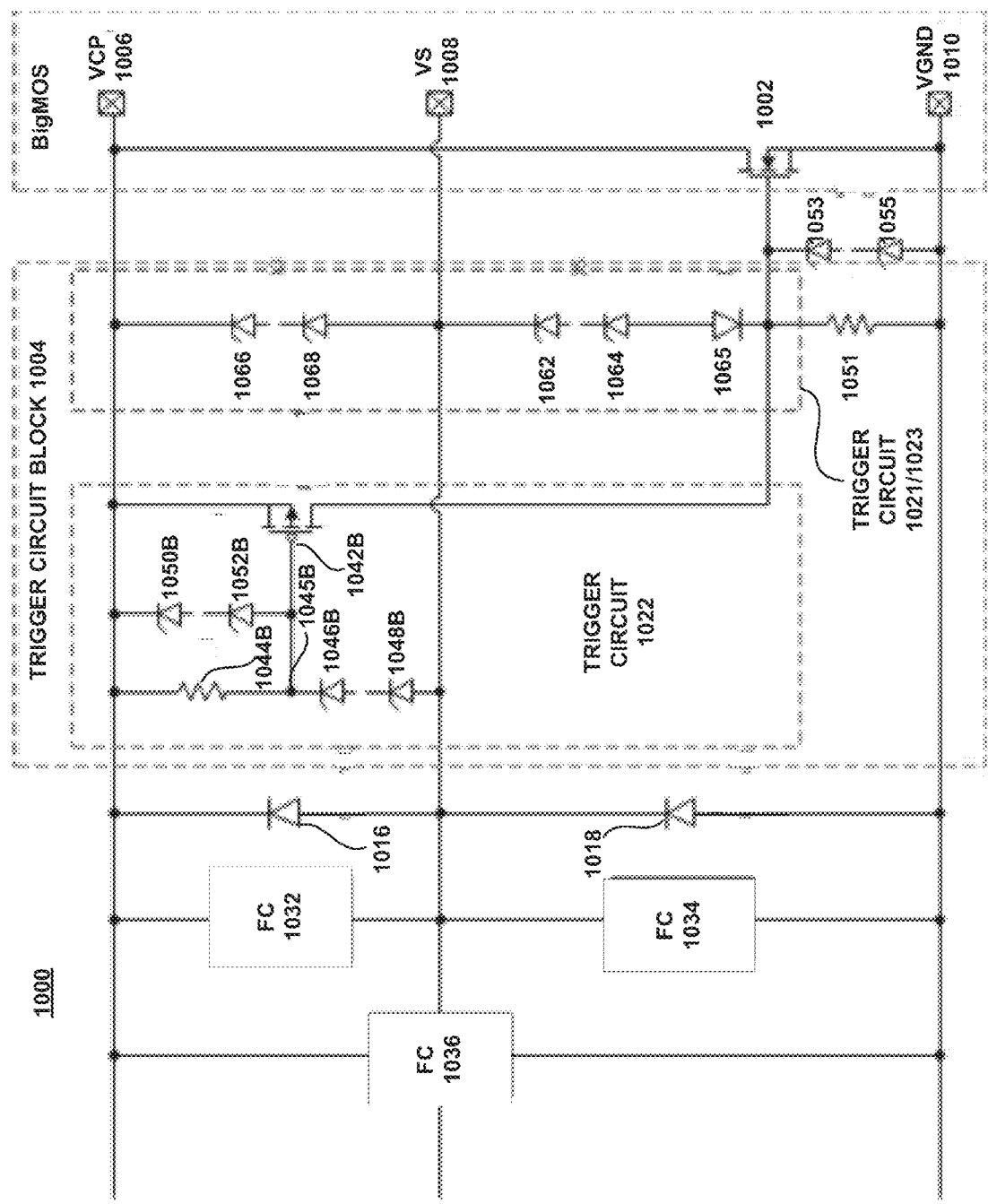
FIG. 10 shows an example of a circuit that includes ESD protection in accordance with the techniques of this disclosure.

FIG. 10 shows circuit 1000, which includes ESD protection in accordance with the techniques of this disclosure. Circuit 1000 includes BigMOS 1002, trigger circuit block 1004, and voltage pins 1006, 1008, and 1010. Circuit 1000 also includes diode 1016 and diode 1018, which are forward-biased diodes. Circuit 1000 also includes functional circuitry 1032, functional circuitry 1034, and functional circuitry 1036. The ESD protection implemented in circuit 1000 is configured to protect functional circuitry 1032, functional circuitry 1034, and functional circuitry 1036. FIG. 10 also shows gate protection circuitry that includes a stack of Zener diodes (e.g. diodes 1053 and 1055 in FIG. 10) aligned in a serial configuration between the gate and source of BigMOS 1002.

Trigger circuit block 1004 includes trigger circuit 1021, trigger circuit 1022, trigger circuit 1023, and resistor 1051. The dotted lines labeled as trigger circuit 1021/1023 is intended to represent that trigger circuit 1021 and trigger circuit 1023 are a merged trigger circuit, meaning they share some components. Trigger circuit 1021 is configured to detect an overvoltage between voltage pins 1006 and 1010, and trigger circuit 1023 is configured to detect an overvoltage between voltage pins 1008 and 1010. Trigger circuit 1023 includes diode 1062 and diode 1064, and trigger circuit 1021 includes diodes 1062 and 1064 in addition to diode 1066 and diode 1068.

In the example of FIG. 10, voltage pin 1006 is configured to receive voltage VCP; voltage pin 1008 is configured to receive voltage VS; and voltage pin 1010 is configured to receive voltage GND. In the example of FIG. 10, BigMOS 1002 is an n-type lateral DMOS transistor. A drain of BigMOS 1002 is connected to the highest voltage input pin of circuit 1000, which is voltage pin 1006 in the example of FIG. 10, and a source of BigMOS 1002 is connected to the lowest voltage input pin of circuit 1000, which is voltage pin 1010 in the example of FIG. 10. Voltage VS may be any voltage between VCP and GND. For purposes of example, it may be assumed for FIG. 10 that the following condition holds: VCP>VS>GND. VCP, VS, and GND represent the voltages that voltage pins 1006, 1008, and 1010 are configured to receive under normal operating conditions.

Each of voltage pins 1006, 1008, and 1010 connects to trigger circuit block 1004. Trigger circuit block 1004 may be configured to detect an overvoltage between any combination of two pins of voltage pins 1006, 1008, and 1010. Trigger circuit block 1004 generally behaves in the same manner as trigger circuit blocks 504 and 804 described above with respect to FIGS. 5 and 8 respectively, but the schematic of FIG. 10 shows more detail regarding the implementations of the trigger circuits. In circuit 1000, functional circuitry 1032 is configured to operate at a voltage of VCP-VS, i.e. the voltage between voltage pin 1006 and voltage pin 1008. Trigger circuit 1022 is configured to detect a voltage event across voltage pins 1006 and 1008, and thus protect functional circuitry 1032. Functional circuitry 1034 is configured to operate at a voltage of VS-GND, i.e. the voltage between voltage pin 1008 and voltage pin 1010. Trigger circuit 1023 is configured to detect a voltage event across voltage pins 1008 and 1010, and thus protect functional circuitry 1034. Functional circuitry 1036 is configured to operate at a voltage of VCP-GND, i.e. the voltage between voltage pin 1006 and voltage pin 1010. Trigger circuit 1021 is configured to detect a voltage event across voltage pins 1006 and 1010, and thus protect functional circuitry 1036.

In response to detecting voltage events, any of trigger circuits 1021-1023 sends a gate control signal to BigMOS 1002, and turns BigMOS 1002 on so that current flows through BigMOS 1002. Trigger circuits 1021-1023 cause BigMos 1002 to turn on by creating a gate-to-source voltage across resistor 1051 that causes a drain-to-source current to flow through BigMos 1002. The gate control signal turns on BigMOS 1002 such that current flows from the drain of BigMOS 1002 to the source of the BigMOS 1002 which is connected to ground. Under normal operating conditions, however, none of trigger circuits 1021-1023 send a gate control signal to BigMOS 1002, and BigMOS 1002 is "off" so that very little current flows through BigMOS 1002.

In one example, under normal operating conditions, voltage pin 1006 receives voltage VCP, and voltage pin 1008 receives voltage VS, meaning the voltage across voltage pins 1006 and 1008 is VCP-VS. Circuit 1000 includes functional circuitry 1032 that may operate at a voltage of VCP-VS. When the voltage across voltage pins 1006 and 1008 is at or close to VCP-VS, then trigger circuit 1022 does not detect an overvoltage and does not send a gate signal to turn on BigMOS 1002. If, however, an ESD event occurs at voltage pins 1006 and 1008, then the voltage across voltage pins 1006 and 1008 may be much higher than VCP-VS, in which case trigger circuit 1022 detects the overvoltage condition and sends a gate control signal to BigMOS 1002, which turns on BigMOS 1002. When BigMOS 1002 is on, current caused by the overvoltage condition flows through BigMOS 1002 to ground as opposed to flowing through functional circuitry 1032, which could potentially damage functional circuitry 1032.

Trigger circuit 1022 includes transistor 1042B, resistor 1044B, a stack of Zener diodes (shown in FIG. 10 as diode 1046B and diode 1048B), diode 1050B, and diode 1052B. In the example of FIG. 10, transistor 1042B may be a p-channel MOSFET with a source of transistor 1042B connected to voltage pin 1006 and a drain of transistor 1042B connected to the gate of BigMOS 1002. Diodes 1046B and 1048B are Zener diodes with one terminal of diode 1046B connected to a gate of transistor 1042B (at node 1045B) and one terminal of diode 1048B connected to voltage pin 1008. One terminal of resistor 1044B is connected to voltage pin 1006, while the other terminal of resistor 1044B is connected, at node 1045B, to both the gate of transistor 1042B and to a terminal of diode 1046B.

As introduced above, trigger circuit 1022 is configured to detect an overvoltage across voltage pins 1006 and 1008. When the voltage at node 1045B is below a threshold level, no current flows from the source of transistor 1042B to the drain of transistor 1042B. When no current flows through transistor 1042B, no gate signal is present at the gate of BigMOS 1002 to turn on BigMOS 1002. When the voltage at node 1045B is above a threshold level, current flows from the source of transistor 1042B to the drain of transistor 1042B causing a gate signal to be present at the gate of BigMOS 1002, which causes BigMOS 1002 to turn on. Thus, trigger circuit 1022 is configured to produce a voltage at 1045B that is below the threshold level during normal operation but is above the threshold level when an overvoltage is present.

As introduced above, diodes 1046B and 1048B are Zener diodes. When the voltage drop across diodes 1046B and 1048B in the forward direction is positive, then diodes 1046B and 1048B conduct electricity. When the voltage drop across diodes 1046B and 1048*b* is positive in the reverse direction but less than the breakdown voltage, then diodes 1046B and 1048B do not conduct electricity. When the voltage drop across diodes 1046B and 1048B is positive in the reverse direction and greater than the breakdown voltage, then diodes 1046B and 1048B conduct electricity. Thus, diodes 1046B and 1048B are selected such that normal voltages do not result in reversed-biased current flow while overvoltages do result in reversed biased current flow. Additionally, the resistance value of resistor 1044B is selected such that when the voltage across voltage pins 1006 and 1010 exceeds VCP-VS by a certain amount, that the voltage drop across resistor 1044B caused by the reverse-biases current flowing through diodes 1046B and 1048B produces a voltage at node 1045B that is above the threshold value that causes transistor 1042B to transmit current.

In another example, under normal operating conditions, voltage pin 1008 receives voltage VS, and voltage pin 1010 receives voltage GND, meaning the voltage across voltage pins 1008 and 1010 is VS-GND. Functional circuitry 1034 may be configured to operate at VS-GND. When the voltage across voltage pins 1008 and 1010 is at or close to VS-GND, then trigger circuit 1023 does not detect an overvoltage and does not send a gate signal to turn on BigMOS 1002. If however, an ESD event occurs at voltage pins 1008 and 1010, then the voltage across voltage pins 1008 and 1010 may be much higher than VS-GND, in which case trigger circuit 1023 detects the overvoltage condition and sends a gate control signal to BigMOS 1002, which turns on BigMOS 1002. When BigMOS 1002 is on, current caused by the overvoltage across voltage pins 1008 and 1010 flows through BigMOS 1002 to ground as opposed to flowing through functional circuitry 1034, which could potentially damage functional circuitry 1034.

Trigger circuit 1023 includes diodes 1062 and 1064, which are Zener diodes, meaning reversed bias current does not flow through diodes 1062 and 1064 when the voltage across diodes 1062 and 1064 is below the breakdown voltage. Reversed bias current, however, does flow through diodes 1062 and 1064 when the voltage across diodes 1062 and 1064 is above the breakdown voltage. Accordingly, trigger circuit 1023 is configured to detect an overvoltage by selecting for diodes 1062 and 1064 Zener diodes that have a breakdown voltage above the or approximately equal to the voltage at which the overvoltage is to be detected. Diodes 1062 and 1064 are also selected such that the breakdown voltage is above the normal operating voltage for the functional circuitry they are configured to protect. In the example of FIG. 10, trigger circuit 1023 is configured to protect functional circuitry 1034, which has a normal operating voltage of VS-GND. Accordingly, the breakdown voltage for diodes 1062 and 1064 may be greater than VS-GND. For purposes of example, if VS-GND is 15V, then the breakdown voltage of diodes 1062 and 1064 may be 17V. Thus, in response to an overvoltage between voltage pin 1008 and voltage pin 1010, current will flow through diodes 1062 and 1064 and turn on BigMOS 1002.

In another example, voltage pin 1006 receives voltage VCP and voltage pin 1010 receives voltage GND, meaning the voltage across voltage pins 1006 and 1010 is VCP-GND. Circuit 1000 includes functional circuitry 1036 that may operate at a voltage of VCP-GND. When the voltage across voltage pins 1006 and 1010 is at or close to VCP-GND, then trigger circuit 1021 does not detect an overvoltage and does not send a gate signal to turn on BigMOS 1002. If, however, an ESD event occurs at voltage pins 1006 and 1010, then the voltage across voltage pins 1006 and 1010 may be much higher than VCP-GND, in which case trigger circuit 1021 detects the overvoltage condition and sends a gate control signal to BigMOS 1002, which turns on BigMOS 1002. When BigMOS 1002 is on, current caused by the overvoltage condition flows through BigMOS 1002 to ground as opposed to flowing through functional circuitry 1036, which could potentially damage functional circuitry 1036.

Trigger circuit 1021 includes diodes a first stack of Zener diodes (shown in FIG. 10 as diodes 1062 and 1064) and a second stack of Zener diodes (shown in FIG. 10 as diodes 1066 and 1068). Diodes 1062, 1064, 1066, and 1068 are Zener diodes, meaning reversed bias current does not flow through diodes 1062, 1064, 1066, and 1068 when the voltage across diodes 1062, 1064, 1066, and 1068 is below the breakdown voltage. Reversed bias current, however, does flow through diodes 1062, 1064, 1066, and 1068 when the voltage across diodes 1062, 1064, 1066, 1068 is above the breakdown voltage. Accordingly, trigger circuit 1021 is configured to detect an overvoltage by selecting for diodes 1062, 1064, 1066 and 1068 Zener diodes that have a breakdown voltage above the approximately equal to the voltage at which the overvoltage is to be detected. Diodes 1062, 1064, 1066 and 1068 are also selected such that the breakdown voltage is above the normal operating voltage for the functional circuitry they are configured to protect. In the example of FIG. 10, trigger circuit 1021 is configured to protect functional circuitry 1036, which has a normal operating voltage of VCP-GND. Accordingly, the breakdown voltage for diodes 1062, 1064, 1066 and 1068 may be greater than VCP-GND. For purposes of example, if VC-GND is 45V, then the breakdown voltage of diodes 1062, 1064, 1066 and 1068 may be 50V. Thus, in response to an overvoltage between voltage pin 1006 and voltage pin 1010, current will flow through diodes 1062, 1064, 1066, and 1068 and turn on BigMOS 1002.

Figure 11:
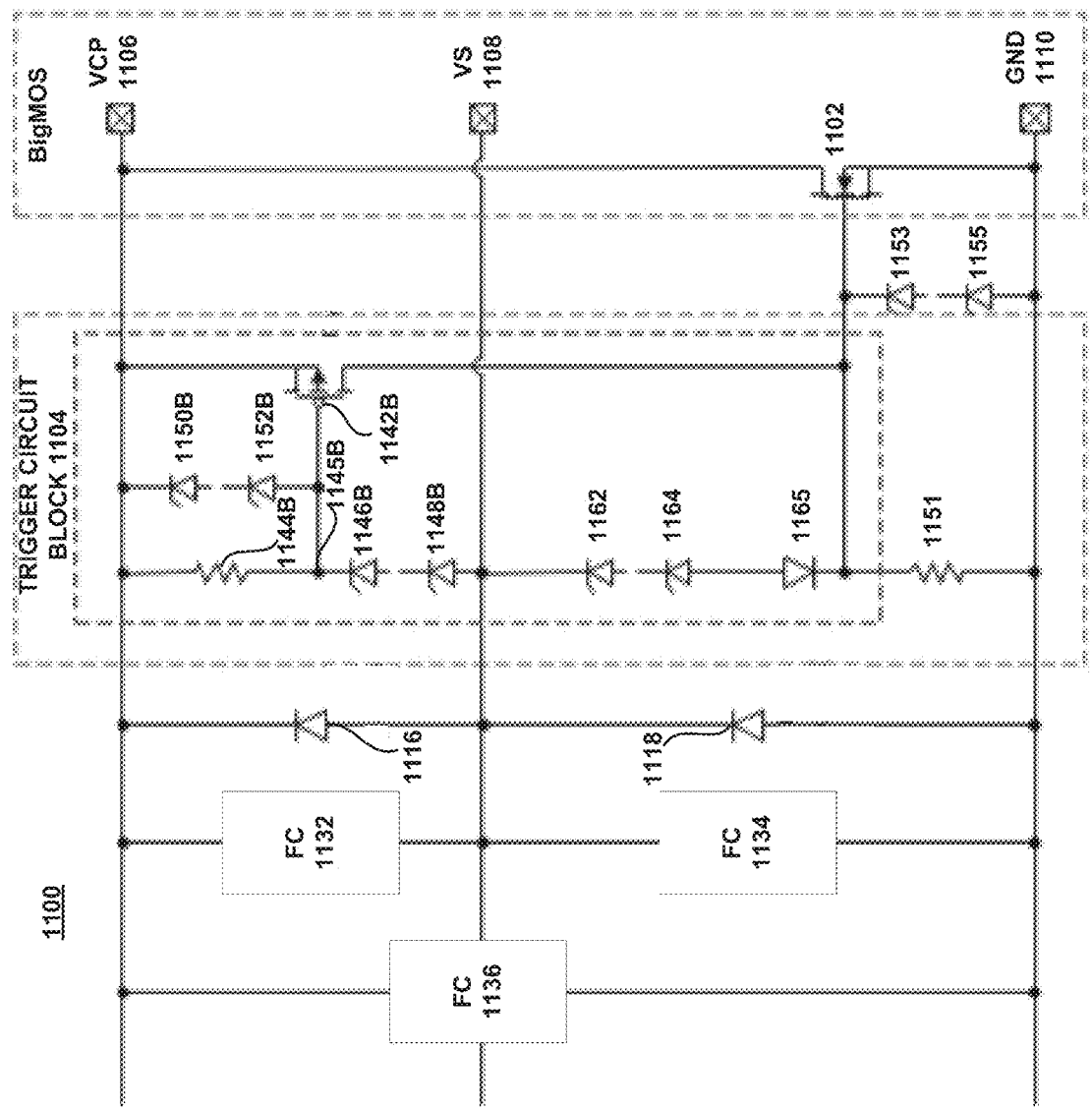
FIG. 11 shows an example of a circuit that includes ESD protection in accordance with the techniques of this disclosure.

FIG. 11 shows circuit 1100, which includes ESD protection in accordance with the techniques of this disclosure. Circuit 1100 includes BigMOS 1102, trigger circuit block 1104, and voltage pins 1106, 1108, and 1110. Trigger circuit block 1104 represents a merged trigger circuit that detects overvoltages between any combination of voltage pins 1106, 1108, and 1110. Circuit 1100 also includes diode 1116 and diode 1118, which are forward-biased diodes. Circuit 1100 also includes functional circuitry 1132, functional circuitry 1134, and functional circuitry 1136. The ESD protection implemented in circuit 1100 is configured to protect functional circuitry 1132, functional circuitry 1134, and functional circuitry 1136. FIG. 11 also shows gate protection circuitry that includes a stack of Zener diodes (e.g. diodes 1153 and 1155 in FIG. 11) aligned in a serial configuration between the gate and source of BigMOS 1102.

In the example of FIG. 11, voltage pin 1106 is configured to receive voltage VCP; voltage pin 1108 is configured to receive voltage VS; and voltage pin 1110 is configured to receive voltage GND. In the example of FIG. 11, BigMOS 1102 may be an n-type lateral DMOS transistor. A drain of BigMOS 1102 is connected to the highest voltage input pin of circuit 1100, which is voltage pin 1106 in the example of FIG. 11, and a source of BigMOS 1102 is connected to the lowest voltage input pin of circuit 1100, which is voltage pin 1112 in the example of FIG. 11. Voltage VS may be any voltage between VCP and GND. For purposes of example, it may be assumed for FIG. 11 that the following condition holds: VCP>VS>GND. VCP, VS, and GND represent the voltages that voltage pins 1106, 1108, and 1110 are configured to receive under normal operating conditions.

Each of voltage pins 1106, 1108, and 1110 connects to trigger circuit block 1104. Trigger circuit block 1104 may be configured to detect an overvoltage between any combination of two pins of voltage pins 1106, 1108, and 1110. Trigger circuit block 1104 generally behaves in the same manner as trigger circuit blocks 504 and 604 described above with respect to FIGS. 5 and 6 respectively, but the schematic of FIG. 11 shows more detail regarding the implementations of the trigger circuits. In circuit 1100, functional circuitry 1132 is configured to operate at a voltage of VCP-VS, i.e. the voltage between voltage pin 1106 and voltage pin 1108. Functional circuitry 1134 is configured to operate at a voltage of VS-GND, i.e. the voltage between voltage pin 1108 and voltage pin 1110. Functional circuitry 1136 is configured to operate at a voltage of VCP-GND, i.e. the voltage between voltage pin 1106 and voltage pin 1110.

In response to detecting voltage events, trigger circuit block 1104 sends a gate control signal to BigMOS 1102, and turns BigMOS 1102 on so that current flows through BigMOS 1102. Trigger circuits 1121-1123 cause BigMos 1102 to turn on by creating a gate-to-source voltage across resistor 1151 that causes a drain-to-source current to flow through BigMos 1102. The gate control signal turns on BigMOS 1102 such that current flows from the drain of BigMOS 1102 to the source of the BigMOS 1102 which is connected to ground. Under normal operating conditions, however, trigger circuit block 1104 does not send a gate control signal to BigMOS 1102, and BigMOS 1102 is "off" so that very little current flows through BigMOS 1102.

In one example, under normal operating conditions, voltage pin 1106 receives voltage VCP, and voltage pin 1108 receives voltage VS, meaning the voltage across voltage pins 1106 and 1108 is VCP-VS. Circuit 1100 includes functional circuitry 1132 that may operate at a voltage of VCP-VS. When the voltage across voltage pins 1106 and 1108 is at or close to VCP-VS, then trigger circuit block 1104 does not detect an overvoltage and does not send a gate signal to turn on BigMOS 1102. If, however, an ESD event occurs at voltage pins 1106 and 1108, then the voltage across voltage pins 1106 and 1108 may be much higher than VCP-VS, in which case trigger circuit block 1104 detects the overvoltage condition and sends a gate control signal to BigMOS 1102, which turns on BigMOS 1102. When BigMOS 1102 is on, current caused by the overvoltage condition flows through BigMOS 1102 to ground as opposed to flowing through functional circuitry 1132, which could potentially damage functional circuitry 1132.

Trigger circuit block 1104 includes transistor 1142B, resistor 1144B, a first Zener diode stack (shown as diode 1146B and diode 1148B in FIG. 11), a second Zener diode stack (shown as diode 1150B and diode 1152B in FIG. 11). In In the example of FIG. 11, transistor 1142B is a p-channel MOSFET with a source of transistor 1142B connected to voltage pin 1106 and a drain of transistor 1142B connected to the gate of BigMOS 1102. Diodes 1146B and 1148B are Zener diodes with one terminal of diode 1146B connected to a gate of transistor 1142B (at node 1145B) and one terminal of diode 1148B connected to voltage pin 1108. As discussed above, diodes 1146B and 1148B are intended to represent a stack that may include more than two diodes. One terminal of resistor 1144B is connected to voltage pin 1106, while the other terminal of resistor 1144B is connected, at node 1145B, to both the gate of transistor 1142B and to a terminal of diode 1146B.

As introduced above, trigger circuit block 1104 is configured to detect an overvoltage across voltage pins 1106 and 1108. When the voltage at node 1145B is below a threshold level, no current flows from the source of transistor 1142B to the drain of transistor 1142B. When no current flows through transistor 1142B, no gate signal is present at the gate of BigMOS 1102 to turn on BigMOS 1102. When the voltage at node 1145B is above a threshold level, current flows from the source of transistor 1142B to the drain of transistor 1142B causing a gate signal to be present at the gate of BigMOS 1102, which causes BigMOS 1102 to turn on. Thus, trigger circuit 1122 is configured to produce a voltage at 1145B that is below the threshold level during normal operation but is above the threshold level when an overvoltage is present.

As introduced above, diodes 1146B and 1148B represent a first stack of Zener diodes. When the voltage drop across the first stack of Zener diodes in the forward direction is positive, then diodes 1146B and 1148B conduct electricity. When the voltage drop across the first stack of Zener diodes is positive in the reverse direction but less than the breakdown voltage, then diodes 1146B and 1148B do not conduct electricity. When the voltage drop across the first stack of Zener diodes is positive in the reverse direction and greater than the breakdown voltage, then diodes 1146B and 1148B conduct electricity. Thus, the diodes in the first stack of diodes are selected such that normal voltages do not result in reversed-biased current flow while overvoltages do result in reversed biased current flow. Additionally, the resistance value of resistor 1144B is selected such that when the voltage across voltage pins 1106 and 1108 exceeds VCP-VS by a certain amount, that the voltage drop across resistor 1144B caused by the reverse-biases current flowing through diodes 1146B and 1148B produces a voltage at node 1145B that is above the threshold value that causes transistor 1142B to transmit current.

In another example, under normal operating conditions, voltage pin 1108 receives voltage VS, and voltage pin 1110 receives voltage GND, meaning the voltage across voltage pins 1108 and 1110 is VS-GND. Functional circuitry 1134 may be configured to operate at VS-GND. When the voltage across voltage pins 1108 and 1110 is at or close to VS-GND, then trigger circuit block 1104 does not detect an overvoltage and does not send a gate signal to turn on BigMOS 1102. If, however, an ESD event occurs at voltage pins 1108 and 1110, then the voltage across voltage pins 1108 and 1110 may be much higher than VS-GND, in which case trigger circuit block 1104 detects the overvoltage condition and sends a gate control signal to BigMOS 1102, which turns on BigMOS 1102. When BigMOS 1102 is on, current caused by the overvoltage across voltage pins 1108 and 1110 flows through BigMOS 1102 to ground as opposed to flowing through functional circuitry 1134, which could potentially damage functional circuitry 1134.

Trigger circuit block 1104 further includes diodes 1162 and 1164, which represent a stack of Zener diodes, meaning reversed bias current does not flow through diodes 1162 and 1164 when the voltage across diodes 1162 and 1164 is below the breakdown voltage. Reversed bias current, however, does flow through diodes 1162 and 1164 when the voltage across diodes 1162 and 1164 is above the breakdown voltage. Accordingly, trigger circuit block 1104 is configured to detect an overvoltage by selecting for diodes 1162 and 1164, and other diodes in the stack, Zener diodes that have a breakdown voltage approximately equal to the voltage at which the overvoltage is to be detected. Diodes 1162 and 1164 are also selected such that the breakdown voltage is above the normal operating voltage for the functional circuitry they are configured to protect. In the example of FIG. 11, trigger circuit block 1104 is configured to protect functional circuitry 1134, which has a normal operating voltage of VS-GND. Accordingly, the breakdown voltage for the stack of Zener diodes represented by diodes 1162 and 1164 may be greater than VS-GND. Thus, in response to an overvoltage between voltage pin 1108 and voltage pin 1110, current will flow through diodes 1162 and 1164 and turn on BigMOS 1102.

In another example, voltage pin 1106 receives voltage VCP and voltage pin 1110 receives voltage GND, meaning the voltage across voltage pins 1106 and 1110 is VCP-GND. Circuit 1100 includes functional circuitry 1136 that may operate at a voltage of VCP-GND. When the voltage across voltage pins 1106 and 1110 is at or close to VCP-GND, then trigger circuit 1104 does not detect an overvoltage and does not send a gate signal to turn on BigMOS 1102. If, however, an ESD event occurs at voltage pins 1106 and 1110, then the voltage across voltage pins 1106 and 1110 may be much higher than VCP-GND, in which case trigger circuit 1104 detects the overvoltage condition and sends a gate control signal to BigMOS 1102, which turns on BigMOS 1102. When BigMOS 1102 is on, current caused by the overvoltage condition flows through BigMOS 1102 to ground as opposed to flowing through functional circuitry 1136, which could potentially damage functional circuitry 1136.

As introduced above, trigger circuit block 1104 includes diodes 1146B, 1148B, 1162, and 1164 which represent a first stack of Zener diodes and a second stack of Zener diodes, respectively, meaning reversed bias current does not flow through diodes 1146B, 1148B, 1162, and 1164 when the voltage across the first and second stack of Zener diodes is below the breakdown voltage for the two stacks. Reversed-bias current, however, does flow through diodes 1146B, 1148B, 1162, and 1164 when the voltage across diodes 1146B, 1148B, 1162, and 1164 is above the breakdown voltage for the two stacks. Additionally, the voltage across resistor 1144B turns on transistor 1142B causing current to flow through transistor 1142B to the gate of BigMOS 1102. Thus, in response to an overvoltage between voltage pin 1110 and voltage pin 1106, current will flow through diodes 1162 and 1164 and flow through transistor 1142B, which turns on Big-MOS 1102. Circuit 1100 also includes diode 1165 to prevent an unwanted current path from the gate of BigMOS 1102 to pin 1108 in the forward-biased direction through diodes 1162 and 1164, which may prevent the turn on of BigMOS 1102.

Various examples of techniques and circuits have been described. These and other examples are within the scope of the following claims.

The invention claimed is:

1. A circuit comprising:
   trigger circuitry configured to detect a first voltage event across a first combination of two nodes of a plurality of three or more nodes and configured to detect a second voltage event across a second combination of two nodes of the plurality of three or more nodes;
   path circuitry;
   an electronic switch configured to direct current through the path circuitry in response to the trigger circuitry detecting the first voltage event across the first combination of two nodes of the plurality of three or more nodes and to direct current through the path circuitry in response to the trigger circuitry detecting the second voltage event across the second combination of two nodes of the plurality of three or more nodes.

2. The circuit of claim 1, wherein the path circuitry provides a current path from any node of the plurality of three or more nodes to a first terminal of the electronic switch and a current path from a second terminal of the electronic switch to any node of the plurality of three or more nodes.

3. The circuit of claim 1, further comprising:
   functional circuitry, and wherein the path circuitry is configured to direct current through the electronic switch and direct current away from the functional circuitry.

4. The circuit of claim 1:
   wherein the plurality of three or more nodes comprises:
      a first pin configured to receive a first voltage;
      a second pin configured to receive a second voltage;
      a third pin configured to receive a third voltage;
   wherein the electronic switch is connected to the first pin and the third pin
   wherein the trigger circuitry is further configured to:
      detect a first voltage event across the first pin and the third pin, and in response to detecting the first voltage event, direct current through the electronic switch;
      detect a second voltage event across the second pin and the third pin, and in response to detecting the second voltage event, direct current through the electronic switch;
      detect a third voltage event across the first pin and the second pin, and in response to detecting the third voltage event direct current through the electronic switch.

5. The circuit of claim 1, wherein the trigger circuitry comprises a stack of Zener diodes, wherein the trigger circuitry is configured to direct current through the electronic switch in response to a voltage across the stack of Zener diodes being greater than a breakdown voltage of the stack of Zener diodes.

6. The circuit of claim 1, wherein the trigger circuitry comprises an RC network, wherein the trigger circuitry is configured to direct current through the electronic switch in response to a rate of voltage increase per time across the RC network exceeding a threshold value.

7. The circuit of claim 1, wherein the path circuitry comprises a stack of diodes connecting all nodes of the plurality of three or more nodes.

8. The circuit of claim 2, wherein the path circuitry comprises:
   a first set of diodes connecting the first terminal of the electronic switch to any node of the plurality of three or more nodes except nodes directly connected to the electronic switch;
   a second set of diodes connecting the second terminal of the electronic switch to any node of the plurality of three or more nodes except the nodes directly connected to the electronic switch.

9. The circuit of claim 1, wherein the path circuitry comprises a diode between any two nodes of the plurality of three or more nodes.

10. The circuit of claim 4, wherein the first voltage event comprises a voltage across the first pin and the third pin exceeding a first threshold, and wherein the second voltage event comprises a voltage across the second pin and the third pin exceeding a second threshold, and wherein the third voltage event comprises a voltage across the first pin and the second pin exceeding a third threshold, wherein at least one threshold differs from the other two thresholds.

11. The circuit of claim 4, wherein the first voltage event comprises a rate of voltage increase per time across the first pin and the third pin exceeding a first threshold , and wherein the second voltage event comprises a rate of voltage increase per time across the second pin and the third pin exceeding a second threshold, and wherein the third voltage event comprises a rate of voltage increase per time across the first pin and the second pin exceeding a third threshold wherein at least one threshold differs from the other two thresholds.

12. The circuit of claim 4, wherein the electronic switch is connected to more than three inputs.

13. The circuit of claim 1, wherein the trigger circuitry directs current through the electronic switch by applying a voltage to a control terminal of the electronic switch.

14. The circuit of claim 1, wherein the voltage events comprise an overvoltage condition.

15. The circuit of claim 1, wherein the voltage events comprise a voltage spike.

16. The circuit of claim 1, wherein the electronic switch comprises a metal-oxide -semiconductor field-effect transistor (MOSFET).

17. The circuit of claim 16, wherein the MOSFET comprises an n-channel double-diffused metal-oxide-semiconductor (DMOS) transistor.

18. The circuit of claim 1, wherein the electronic switch comprises a bipolar transistor.

19. The circuit of claim 1, wherein the electronic switch comprises a Gallium Nitride (GaN) field effect transistor.

20. The circuit of claim 1, wherein the electronic switch comprises a thyristor.

21. The circuit of claim 1, wherein the trigger circuitry comprises a transistor, and wherein the trigger circuitry is configured to apply a voltage to a control terminal of the electronic switch.

22. The circuit of claim 1, wherein the circuit comprises at least one of
   a part of an integrated circuit;
   a part of a printed circuit board; or
   a part of a microcontroller.

* * * * *